United States Patent
Hashimoto et al.

(10) Patent No.: US 6,523,025 B1
(45) Date of Patent: Feb. 18, 2003

(54) DOCUMENT PROCESSING SYSTEM AND RECORDING MEDIUM

(75) Inventors: Minako Hashimoto, Kawasaki (JP); Wakako Kashino, Machida (JP); Ryo Ochitani, Kawasaki (JP); Fumihito Nishino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/630,553

(22) Filed: Aug. 1, 2000

Related U.S. Application Data

(63) Continuation of application No. PCT/JP98/05926, filed on Dec. 24, 1998.

(30) Foreign Application Priority Data

Mar. 10, 1998 (JP) .......................................... 10-058384

(51) Int. Cl.[7] ............................. G06F 17/30; G06F 7/00
(52) U.S. Cl. ....................................................... 707/3
(58) Field of Search ................................... 707/1, 3, 5

(56) References Cited

U.S. PATENT DOCUMENTS

| | | | | |
|---|---|---|---|---|
| 5,953,718 | A | * 9/1999 | Wical | 707/5 |
| 5,957,520 | A | * 9/1999 | Suda et al. | 295/706 |
| 5,963,940 | A | * 10/1999 | Liddy et al. | 707/5 |
| 5,999,925 | A | * 12/1999 | Evans | 707/5 |
| 6,026,388 | A | * 2/2000 | Liddy et al. | 707/1 |
| 6,243,723 | B1 | * 6/2001 | Ikeda et al. | 707/3 |
| 6,263,335 | B1 | * 7/2001 | Paik et al. | 707/5 |

OTHER PUBLICATIONS

Tatsuo Kamio, Automated Indexing for Making of a Newspaper Article Database, Information and Documentation, vol. 32, No. 4, English abstract.

Akitoshi Okumura, et al., "Information Sharing Platform Based on 5W1H Clustering and Navigation", Joho Shori Gakkai Kenkyu Houkoku, (97–DD–9–1), English abstract.

\* cited by examiner

*Primary Examiner*—John Breene
*Assistant Examiner*—Susan F. Rayyan
(74) *Attorney, Agent, or Firm*—Staas & Halsey LLP

(57) ABSTRACT

The accuracy of retrieving or clipping documents is improved. A document to be processed is input via a document input section. Event specifying means looks up knowledge information stored in knowledge information storing means to specify the type of an event described in the input document. Attribute value extracting means extracts, from the document, attribute values of attributes relating to the specified event. Correlating means performs a process of correlating the attribute values extracted by the attribute value extracting means with entities in the real world. Document storing means stores information (normalized information) generated by the correlating means and the document or information specifying a storage location thereof in a manner associated with each other. Document extracting means compares a query input from a user interface section with the normalized information and extracts, from the document storing means, matching documents or information specifying their storage locations.

14 Claims, 31 Drawing Sheets

```
typedef name(.*)
tagclass name <company info>, <product>, <alteration>, <act>
def <date> ([0123456789]*day)
module main on <date>,<company info> released <product>

<company info> released <product>
<company info> released <product><date>
<company info> releaed <product><act>, <date>
endmodule
    def<business category>(maker of.*, company of .*, major company of .*,
    developer of.*, retailer of.*, manufacturer of.*)

def<business category 2> (.*)
    def<company name> (._*)

synset connective,"which produces","the maker of ","which produces and sells"

module company info
    <business category>. <company name>

<company name>&connective; <company name>
    <company name>
endmodule endmodule
```

FIG. 5

| EXPRESSION | NORMALIZED NUMERICAL VALUE | EXPRESSION | NORMALIZED NUMERICAL VALUE |
|---|---|---|---|
| zero | 0 | sixth | 6 |
| ○ | 0 | 7th | 7 |
| 1st | 1 | seventh | 7 |
| first | 1 | 8th | 8 |
| 2nd | 2 | eighth | 8 |
| second | 2 | 9th | 9 |
| 3rd | 3 | ninth | 9 |
| third | 3 | 10th | 10 |
| 4th | 4 | tenth | 10 |
| fourth | 4 | 11th | 11 |
| 5th | 5 | eleventh | 11 |
| fifth | 5 | 12th | 12 |
| 6th | 6 | twelfth | 12 |

FIG. 7

| EXPRESSION | type | CORRESPONDING NORMALIZED NUMERICAL VALUE |
|---|---|---|
| last year | date | %docyear-1 |
| the year before last | date | %docyear-2 |
| the year before | date | %docyear-1 |
| next year | date | %docyear+1 |
| the following year | date | %docyear+1 |
| this year | date | %docmonth |
| last month | date | %docmonth-1 |
| the previous month | date | %docmonth-1 |
| next month | date | %docmonth+1 |
| this month | date | %docmonth |
| yesterday | date | %docday-1 |
| the previous day | date | %docday-1 |
| tommorow | date | %docday+1 |
| today | date | %docday |
| the beginning of a month | daterange | from %year-%month-1 to %year-%month-10 |
| the end of the month | daterange | from %year-%month-21 to %year-%month-31 |
| the first ten days of a month | daterange | from %year-%month-1 to %year-%month-10 |
| the middle ten days of a month | daterange | from %year-%month-11 to %year-%month-20 |
| the last ten days of a month | daterange | from %year-%month-21 to %year-%month-31 |
| Heisei(the name of an era) | data | %docyear+1998 |
| spring | daterange | from %year-3-1 to %year-5-31 |
| summer | daterange | from %year-6-1 to %year-8-31 |
| autumn | daterange | from %year-9-1 to %year-11-30 |
| winter | daterange | from %year-12-1 to %year-2-29 |
| the New Year | daterange | from %????-1-1 to %????-1-7 |
| Golden Week | daterange | from %????-4-26 to %????-5-5 |
| GW | daterange | from %????-4-26 to %????-5-5 |
| Chiristmas | daterange | from %????-12-1 to %????-12-25 |
| entrance celemony season | daterange | from %????-4-1 to %????-4-30 |
| entrance examination season | daterange | from %????-1-10 to %????-3-30 |
| rainy season | daterange | from %????-6-1 to %????-7-10 |

FIG. 8

| EXPRESSION | NORMALIZED NUMERICAL VALUE | EXPRESSION | NORMALIZED NUMERICAL VALUE |
|---|---|---|---|
| ○ | 0 | nine | 9 |
| zero | 0 | ten | ×10 |
| one | 1 | hundred | ×100 |
| two | 2 | thousand | ×1000 |
| three | 3 | ten thousand | ×10000 |
| four | 4 | hundred million | ×100000000 |
| five | 5 | trillion | ×1000000000000 |
| six | 6 | hundred trillion | ×10000000000000000 |
| seven | 7 | hundredth | ×0.01 |
| eight | 8 | thousandth | ×0.001 |

FIG. 14

Hashimoto Electric announced that Hashimoto Electric released the JCN-compatible PC " GNW Series" on 18th. Hashimoto Electric developed and released his own designed PC. But because of opposing to the tendency to low price competition, Hashimoto Electric developed JCN-compatible PC which was a global industry-standard. Hashimoto Electric released a total of six models, seventeen designs of a desktop type PC and a notebook type PC. All models mounted Jofum's CPU "597", sophisticated soft OS and V-OS 98. These products were aimed at a personal user or a network system of a company. Parts were produced from Taiwan, and the average overseas procurement rate for parts increased from thirty percents to seventy percents. As a result, the manufacturing cost was reduced. The price of a desktop type was from one hundred seventy eight thousand yen to three hundred seventy eight thousand yen. A notebook type equipped with a black-and white display was from two hundred twenty eight thousand yen to three hundred forty eight thousand yen. A notebook type equipped with a color display was from forty hundred twenty eight thousand yen to seventy hundred forty eight thousand yen.

FIG. 15

```
<add-anno>
  <article content sentence end expression=predicate announce present aspect=past>
    <releasing entity organization info>
      <organization name>Hashimoto Electric(0001)</organization name>
    </releasing entity organization info>
    <release date type=date value=1993-10-18>
      <day>18th</day>
    </release date>
    <article content・declinable word type 1 field=sell-product aspect=past>
      <sales info・declinable word type 1>
        <sales info・declinable word type 10>
          <on-sale product info>
            <product info>
              <type>JCN-compatible PC</type>
              <product name>GNW Series</product name>
            </product info>
          </on-sale product info>
        </sales info・declinable word type 10>
      </sales info・declinable word type 1>
    </article content・declinable word type 1>
  </article content>
  <article content remainder>
    ...developed and released his own designed PC.  But because of opposing
    to the tendency to low price competition, Hashimoto Electric introduced
    JCN-compatible PC which was a global industry-standard.  Hashimoto
    Electric released a total of six models, seventeen designs of a desktop
    type PC and a notebook type PC.  All models mounted Jofum's CPU "597",
    sophisticated soft OS and V-OS 98.  These products were aimed at a
    personal user or a network system of a company.  Parts were produced from
    Taiwan, and the average overseas procurement rate for parts was from
    thirty percents to seventy percents.  As a result, the manufacturing cost
    was reduced.
    The price of a desktop type was ...
  </article content remainder>
  <price type=price unit=yen value="from 178000 to 178000">
    <amount>178,000</amount>
  </price>
  <article content remainder>
    ...three hundred seventy eight thousand yen.  A notebook type equipped
    with a black-and white display was from two hundred twenty eight thousand
    yen...
```

FIG. 16

Hokkaido Ohiki Fork Lift (Ishikari-machi, Ishikari-kannai, president Akutagawa Ryutaro) which was a sales subsidiary of Ohki Lift in Hokkaido merged in Higashi-Hokkaido Ohki Fork Lift (Memuro-machi, Tokachi-kannai, the same president) on 1st. This merger was carried out for the purpose of bolstering a nationwide sales network. This aimed to unity the management and to have the system ready for the efficient service.
New company name was Hokkaido Ohki Fork Lift and Mr. Akutagawa was inaugurated as the president. The company is capitalized at two hundred and forty million yen and has one hundred thirty employees.

FIG. 17

```
<add-anno>
<article content sentence end expression=predicate announce absent>
 <article content・declinable word type 0 field=merger information aspect=past>
<merger info・declinable word type 0>
<merging entity organization info type=merging entity organization info>

<related organization name>Ohki Lift(020)</related organization name>
<related organization business category>
  sales subsidiary in Hokkaido</related organization business category>
<organization name>Hokkaido Ohki Fork Lift(021)</organization name>

<merging organization supplementary info 1 type=organization supplementary info>
<element 1 no. of elements=2 type=element>
<organization location>Ishikari-machi, Ishikari-kannnai</organization location>
</element 1>
<element 2 no. of elements=2 type=element>
<name>Akutagawa Ryutaro(0251)</name>
  <managerial position>president</managerial position>
</element 2>
</merging organization supplementary info 1>
<organization name>Higashi-Hokkaido Ohoki Fork Lift(021)</organization name>

<merging organization supplementary info 2 type=organization supplementary info>

<element 1 no. of elements=2 type=element>
<organization location>Memuro-machi, Tokachi-kannai</organization location>
</element 1>
<element 2 no. of elements=2 type=element
 reference type=same1 reference target=previous(0251))>
<reference expression>same</reference expression>
</element 2>
</merging organization supplementary info 2>
</merging entity organization info>
<merger date type=date value=1994-04-01>
<day>1st</day>
</merger date>
</merger info・declinable word type 0>
 </article content・declinable word type 0>
</article content>
<article content remainder>
 <article content remainder 0>

...was carried out for the purpose of bolstering a nationwide sales network.  This aimed to unity the management and to have the system ready for the efficient service.

</article content remainder 0>
  <new organization name>Hokkaido Ohki Fork Lift</new organization name>
<article content remainder 0>, Mr. Akutagawa was inaugurated as the president. The capital was
    </article content remainder 0>
</article content remainder>
<price type=price unit=yen value="from 240000000 to 240000000">
<capital>two hundred forty milion</capital>
 </price>
<article content remainder>, one hundred thirty employee
</article content remainder>
<add-anno>
```

FIG. 18

```
                   Query Input Screen

Product Sales Information

Organization name: [                              ]

Product type:      [                              ]

from [ ][ ][ ][ ][ ][ ][ ] yen
   Price:         ?
            to   [ ][ ][ ][ ][ ][ ][ ] yen from [ ][ ][ ](year)[ ][ ](month)[ ][ ](day)
Release date:    ?
            to   [ ][ ][ ](year)[ ][ ](month)[ ][ ](day)

[ Search ]
```

FIG. 19

```
┌─────────────────────────────────────────────────────────┐
│                    Query Input Screen                   │
├─────────────────────────────────────────────────────────┤
│                                                         │
│                 Product Sales Information               │
│                                                         │
│  Organization name: │ A A A                          │  │
│                                                         │
│  Product type:      │ PC                             │  │
│                                                         │
│              from  │  │ 1│0│0│0│0│0│ yen              │
│   Price:                    ≀                           │
│              to    │  │ 3│0│0│0│0│0│ yen              │
│                                                         │
│              from  │1│9│9│7│(year)│ 1│(month)│ 1│(day) │
│   Release date:                 ≀                       │
│              to    │1│9│9│7│(year)│ 6│(month)│3│0│(day)│
│                                                         │
│                         │ Search │                      │
│                                                         │
└─────────────────────────────────────────────────────────┘
```

| Search Results Display Screen | | | | | |
|---|---|---|---|---|---|
| Product Sales Information | | | | | |
| Organization name | Product type | Product name | Price | Release date | Heading |
|  |  |  |  |  |  |
|  |  |  |  |  |  |
|  |  |  |  |  |  |
|  |  |  |  |  |  |

Search Results Display Screen

Product Sales Information

| Organization name | Product type | Product name | Price | Release date | Heading |
|---|---|---|---|---|---|
| A A A | Desktop type PC |  | 200,000~299,999 | 1997/02/29 | Low price PC released |
| A A A | PC formed integral with a display unit | B B B B B | 268,000 | 1997/03/01 | New series BBBBB released |
| A A A | Notebook type PC equipped with a color display | C C C C C | 298,000 | 1997/04/11 | New AAA released |
| A A A | Compatible PC | D D D D D | 178,000 | 1997/05/20 | Compatible PC released |

FIG. 22

```
┌─────────────────────────────────────────────────┐
│              Query Input Screen                 │
├─────────────────────────────────────────────────┤
│                                                 │
│            Organization Merger Information      │
│                                                 │
│  Organization name: [                        ]  │
│                                                 │
│                                                 │
│  Organization name: [                        ]  │
│                                                 │
│                from [ ][ ][ ][ ](year)[ ][ ](month)[ ][ ](day)
│  Merger date:              ≀                    │
│                to   [ ][ ][ ][ ](year)[ ][ ](month)[ ][ ](day)
│                                                 │
│                    [ Search ]                   │
│                                                 │
└─────────────────────────────────────────────────┘
```

FIG. 23

```
                       Query Input Screen

Organization Merger Information

Organization name:  | A A A                              |

Organization name:  |                                    | from | 1 | 9 | 9 | 7 |(year)|   | 1 |(month)|   | 1 |(day)
Merger date:                         ≀
              to   | 1 | 9 | 9 | 7 |(year)| 1 | 2 |(month)| 3 | 1 |(day)

| Search |
```

FIG. 24

| Search Results Display Screen | | | | |
|---|---|---|---|---|
| Organization Merger Information | | | | |
| Organization name | Organization name | New organization name | Merger date | Heading |
| | | | | |
| | | | | |
| | | | | |
| | | | | |

FIG. 25

Search Results Display Screen

Organization Merger Information

| Organization name | Organization name | New organization name | Merger date | Heading | | | |
|---|---|---|---|---|---|---|---|
| A A A | B B B | C C C | 1997/04/01 | AAA, BBB, mergers | | | |

FIG. 26

DOCUMENT PROCESSING SYSTEM AND RECORDING MEDIUM

This application is a continuing application, filed under 35 U.S.C. §111(a), of International Application PCT/JP98/05926, filed Dec. 24, 1998, and is based on and hereby claims priority to Japanese Patent Application 10-058384, filed Mar. 10, 1998.

BACKGROUND OF THE INVENTION (1) Field of the Invention

The present invention relates to a document processing system for storing input documents after subjecting the documents to a predetermined process and for retrieving or clipping documents matching a given query from the stored documents, and to a recording medium recording a program for causing a computer to perform such processes.

(2) Description of the Related Art

With recent popularization of the Internet and an increasing number of full-text databases, information available to individuals is drastically expanding.

To acquire desired information from among such a vast amount of information, a method is generally adopted in which a retrieval process, clipping process or the like is performed using, as a key, search terms (query) describing features of data to be obtained, for example.

With conventional large-scale commercial on-line databases or full-text retrieval systems, however, if the condition of search terms is loosened, noise (unneeded data) included in the search results increases; conversely, if the search condition is narrowed, search omission may result, giving rise to a problem that it is difficult for the user to acquire desired data.

Specifically, in a document culling or narrowing process or a document retrieval process adopted in conventional document filtering, ranking retrieval based on the degree of coincidence or relevancy between the query and document contents is conducted at best, and accordingly, it is difficult to carry out document culling that fully reflects the importance of information included in documents or the user's purpose of performing search.

Consequently, even in the case where the user desires to search for an organization named "Hashimoto", for example, documents including "Hashimoto" as a name of place are very often retrieved.

Also, when new products priced in the 200000 to 299999 yen range are to be searched for, it is necessary to use a query which is created taking account of every possibility like "two hundred thousand yen", "200,000 yen", "two hundred ten thousand yen" and "two hundred fifty thousand yen".

Further, although it is possible to search for documents by specifying a document creation date, date information included in documents cannot be utilized for search.

In the following sentences, for example, "the 1st" means different days, though the words used are the same.

(a) On the 1st, Corporation A will release Product B.

(b) On the 1st, Corporation A released Product B.

If the sentences were created on Feb. 15, 1997, "1st" means Mar. 1, 1997 in the case of (a), and means Feb. 1, 1997 in the case of (b).

The conventional method is thus associated with a problem that it is difficult to recognize the attributes of date information in documents and to use (utilize) such information for search.

SUMMARY OF THE INVENTION

The present invention was created in view of the above circumstances, and an object thereof is to provide a document processing system capable of performing document retrieval or document culling that fully reflects the user's purpose of performing search.

It is another object of the present invention to provide a recording medium recording a document processing program for performing a document retrieval process or clipping process that fully reflects the user's purpose of performing search.

FIG. 1 illustrates the principles of the present invention for achieving the above objects. The present invention provides a document processing system for storing input documents after subjecting the documents to a predetermined process and for retrieving or clipping documents matching a given query from the stored documents, the system comprising knowledge information storing means 3, event specifying means 4, attribute value extracting means 5, correlating means 10, document storing means 11, and document extracting means 12.

The knowledge information storing means 3 stores knowledge information necessary for processing an input document. The event specifying means 4 specifies the type of an event described in the input document by looking up the knowledge information stored in the knowledge information storing means 3. The attribute value extracting means 5 extracts, from the input document, attribute values of attributes relating to the event specified by the event specifying means 4 by looking up the knowledge information stored in the knowledge information storing means 3. The correlating means 10 correlates the attribute values extracted by the attribute value extracting means 5 with entities in the real world by looking up the knowledge information stored in the knowledge information storing means 3. The document storing means 11 stores the attribute values correlated by the correlating means 10 and the input document or information specifying a storage location thereof in a manner associated with each other. The document extracting means 12 looks up the attribute values and a query to retrieve or clip target documents.

The knowledge information storing means 3 stores events, attributes relating thereto, and information for extracting attribute values constituting the attributes, in a manner associated with one another. The event specifying means 4 collates an input document with the knowledge information stored in the knowledge information storing means 3, to thereby specify an event described in the document. The attribute value extracting means 5 refers to the knowledge information storing means 3 and extracts attribute values of attributes relating to the specified event from the document. The correlating means 10 correlates the extracted attribute values with entities in the real world into one-to-one correspondence by looking up the knowledge information stored in the knowledge information storing means 3. The document storing means 11 stores the thus-correlated attribute values and the document or information specifying a storage location thereof in a manner associated with each other. The document extracting means 12 collates information included in an input query with the attribute values stored in the document storing means 11, to extract desired documents.

Thus, the contents of documents are grasped in terms of event, and information generated by extracting attribute values of attributes constituting the grasped event and correlating the extracted attribute values with entities in the real world is looked up to retrieve or clip documents, whereby the retrieval or clipping accuracy can be improved.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 shows an example of knowledge information;

FIG. 7 is a chart showing an example of a numeral conversion table;

FIG. 8 is a chart showing an example of a date expression conversion table;

FIG. 14 is a chart showing an example of a money amount expression conversion table;

FIG. 15 shows an example of a document input to the embodiment shown in FIG. 1;

FIG. 16 shows an example of normalized information generated as a result of processing the document shown in FIG. 15;

FIG. 17 shows another example of a document input to the embodiment shown in FIG. 1;

FIG. 18 shows an example of normalized information generated as a result of processing the document shown in FIG. 17;

FIG. 19 shows an example of an input screen displayed when documents including product sales information are to be retrieved;

FIG. 20 shows an example of data entry in the input screen shown in FIG. 19;

FIG. 21 shows an example of a search results display screen associated with the input screen shown in FIG. 19;

FIG. 22 shows an example of a screen showing search results obtained as a result of the data entry shown in FIG. 20;

FIG. 23 shows an example of an input screen displayed when documents including organization merger information are to be retrieved;

FIG. 24 shows an example of data entry in the input screen shown in FIG. 23;

FIG. 25 shows an example of a search results display screen associated with the input screen shown in FIG. 23;

FIG. 26 shows an example of a screen showing a search result obtained as a result of the data entry shown in FIG. 24;

DESCRIPTION OF THE PREFERRED EMBODIMENT

An embodiment of the present invention will be hereinafter described with reference to the drawings.

Figure 1:
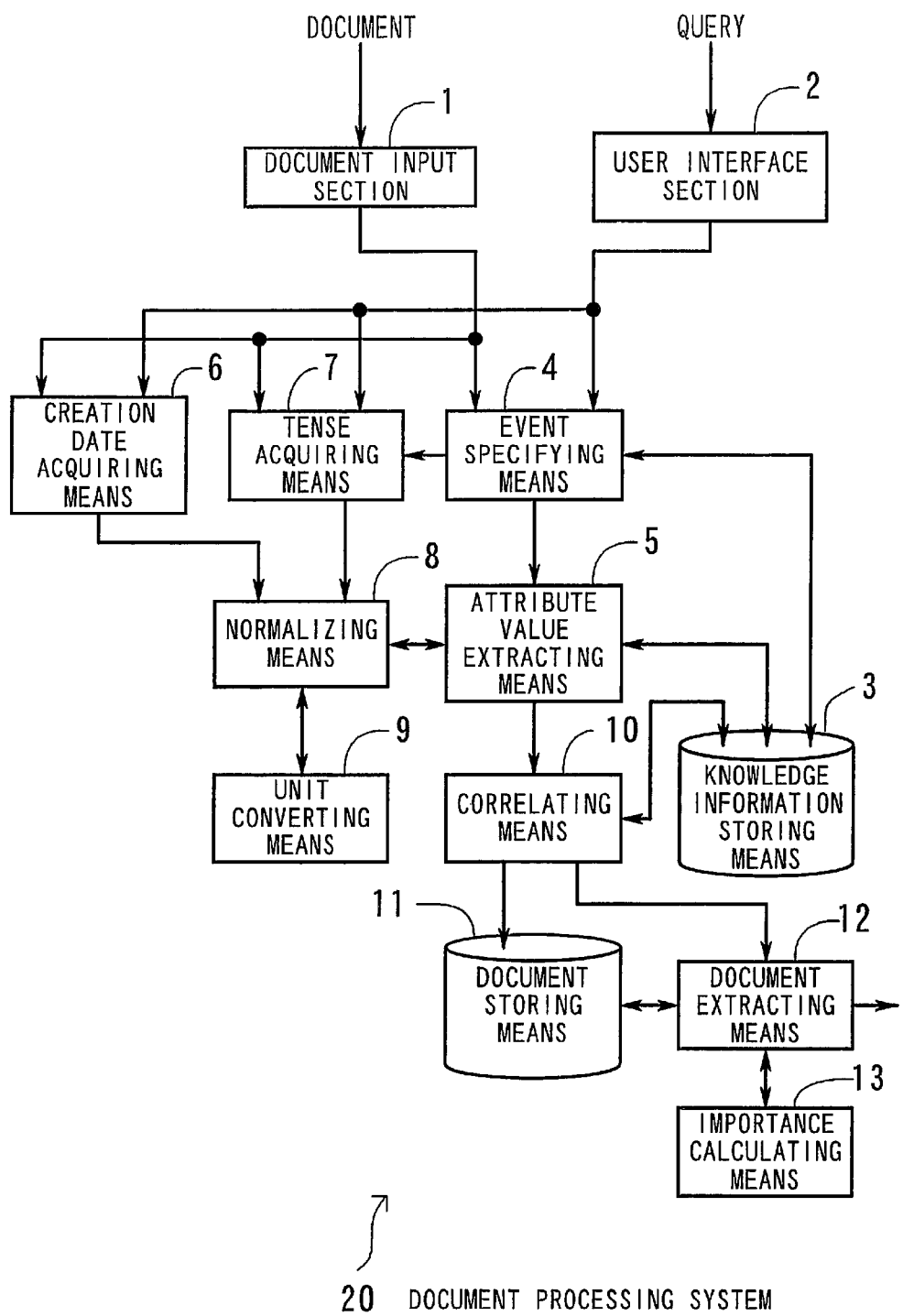
FIG. 1 is a block diagram showing an example of configuration according to one embodiment of the present invention.

FIG. 1 shows an example of a configuration according to the embodiment of the present invention. In the figure, a document input section 1 is supplied with documents to be processed, and a user interface section 2 receives queries from users.

Knowledge information storing means 3 stores information about events, described later, and attributes relating thereto, as well as information for converting proper names to proper codes.

Event specifying means 4 looks up knowledge information (information about event types) stored in the knowledge information storing means 3, to specify the type of an event described in a document or a query input from the document input section 1 or from the user interface section 2.

"Event" denotes herein an "occurrence" that takes place in the real world. A newspaper article, for example, is regarded as describing an event that took place (or will take place) in the real world, such as the event "Corporation A releases X.", along with various supplementary information.

Accordingly, if the above sentence "Corporation A releases X.", for example, is input to the event specifying means 4, the event described in the sentence is specified as <release of new product>. The signs "<" and ">" represent conceptualization of the terms inserted therebetween by abstraction.

In documents like newspaper articles in which events described are definite and the patterns of expression are limited, certain constraints naturally fall upon structures that the described events can take on (hereinafter abbreviated as "event structures" where appropriate). By focusing on such "events" when analyzing documents, therefore, it is possible to perform effective processing.

Attribute value extracting means 5 looks up knowledge information (information about attributes relating to a certain event) stored in the knowledge information storing means 3 and extracts attribute values from the document or query.

In relation to the aforementioned event "release of new product", for example, the knowledge information storing means 3 stores attributes <selling company>, <product info>, <date>, <alteration>, etc., and the attribute value extracting means 5 acquires attributes corresponding to the event specified by the event specifying means 4 from the knowledge information storing means 3, and extracts attribute values corresponding to the acquired attributes from the document or query.

For example, in the case of the event "Corporation A releases X." mentioned above, the attribute value "Corporation A" corresponding to the attribute <selling company> and the attribute value "X" corresponding to the attribute <product info> are extracted.

Creation date acquiring means 6 acquires a date of creation of the document or query, and tense acquiring means 7 acquires tense of a sentence constituting the document or query.

Normalizing means 8 selects, from among the attribute values extracted by the attribute value extracting means 5, those which can be converted to numerical values, and converts (normalizes) them to corresponding numerical values.

Unit converting means 9 converts units of the numerical values normalized by the normalizing means 8.

Correlating means 10 looks up the knowledge information stored in the knowledge information storing means 3, to correlate the attribute values extracted by the attribute value extracting means 5 with entities in the real world. The "entity" means herein an "object" in the real world that is denoted by the attribute value described in the document. If, in the above example, there exist a plurality of enterprises called "Corporation A", then it is necessary to specify which enterprise (object) is denoted by "Corporation A" described in the document. Accordingly, the correlating means 10 looks up other attribute values (e.g., "president name", "place of head office", etc.) in the document to identify "Corporation A".

Document storing means 11 stores a set of the attribute values correlated by the correlating means 10 and the original document (or information specifying a storage location of the original document) in a manner associated with each other.

Document extracting means 12 acquires, from the document storing means 11, documents matching a query supplied thereto from the correlating means 10 by looking up the attribute values. Then, looking up the importance of each document calculated by importance calculating means 13, the document extracting means outputs those documents of which the importance is higher than a certain threshold.

The importance calculating means 13 calculates the importance of a target document by obtaining the frequency of occurrence of a certain keyword, for example.

Figure 2:
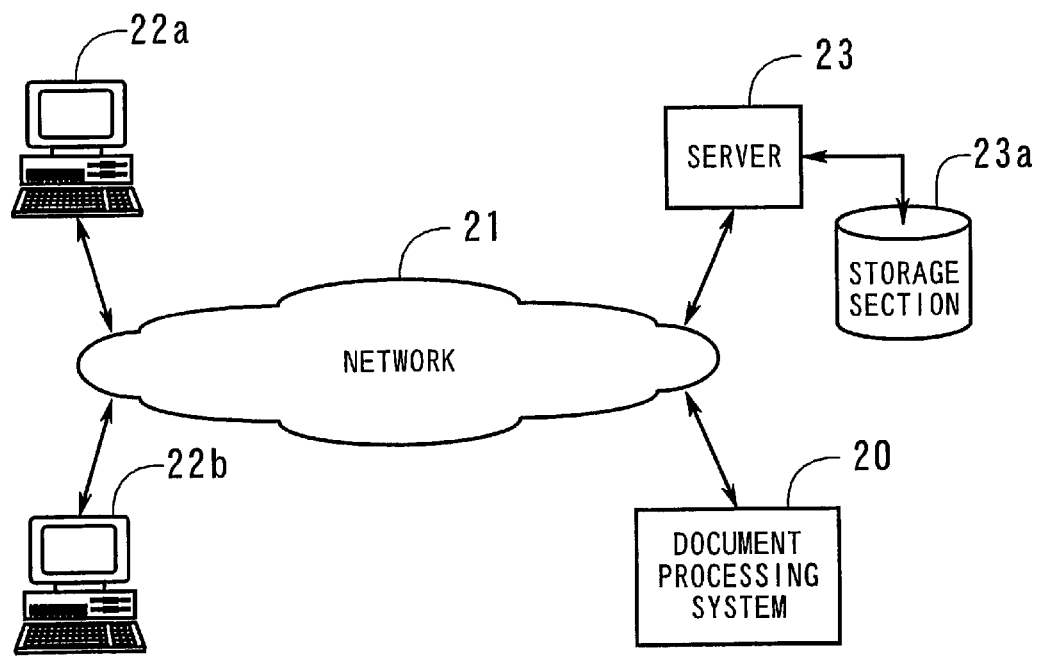
FIG. 2 illustrates an example of configuration of a communication system including a document processing system shown in FIG. 1.

Referring now to FIG. 2, an example of a communication system configuration including the embodiment shown in FIG. 1 will be described.

In FIG. 2, the document processing system 20 shown in FIG. 1 is connected to a network 21 such as the Internet, for example.

To the network 21 are connected terminal units 22*a* and 22*b*, a server 23, etc.

The terminal unit 22*a*, 22*b* accepts a query which the user has entered through operation of an input section thereof and transmits the input query to the document processing system 20. When documents matching the query are transmitted from the document processing system 20, the terminal unit receives the documents and outputs same to its CRT (Cathode Ray Tube) monitor or the like to be displayed thereat.

The server 23 transmits, through the network 21, information such as documents and images stored in a storage section 23*a* to a device which has made a request.

The document processing system 20 stores the query transmitted from the terminal unit 22*a*, 22*b*, and when a new document is supplied from the server 23, for example, and if there is a high degree of relevancy between this document and the query, the document processing system transmits the document to the terminal unit 22*a* or 22*b*.

The operation of the above embodiment will be now described.

Figure 3:
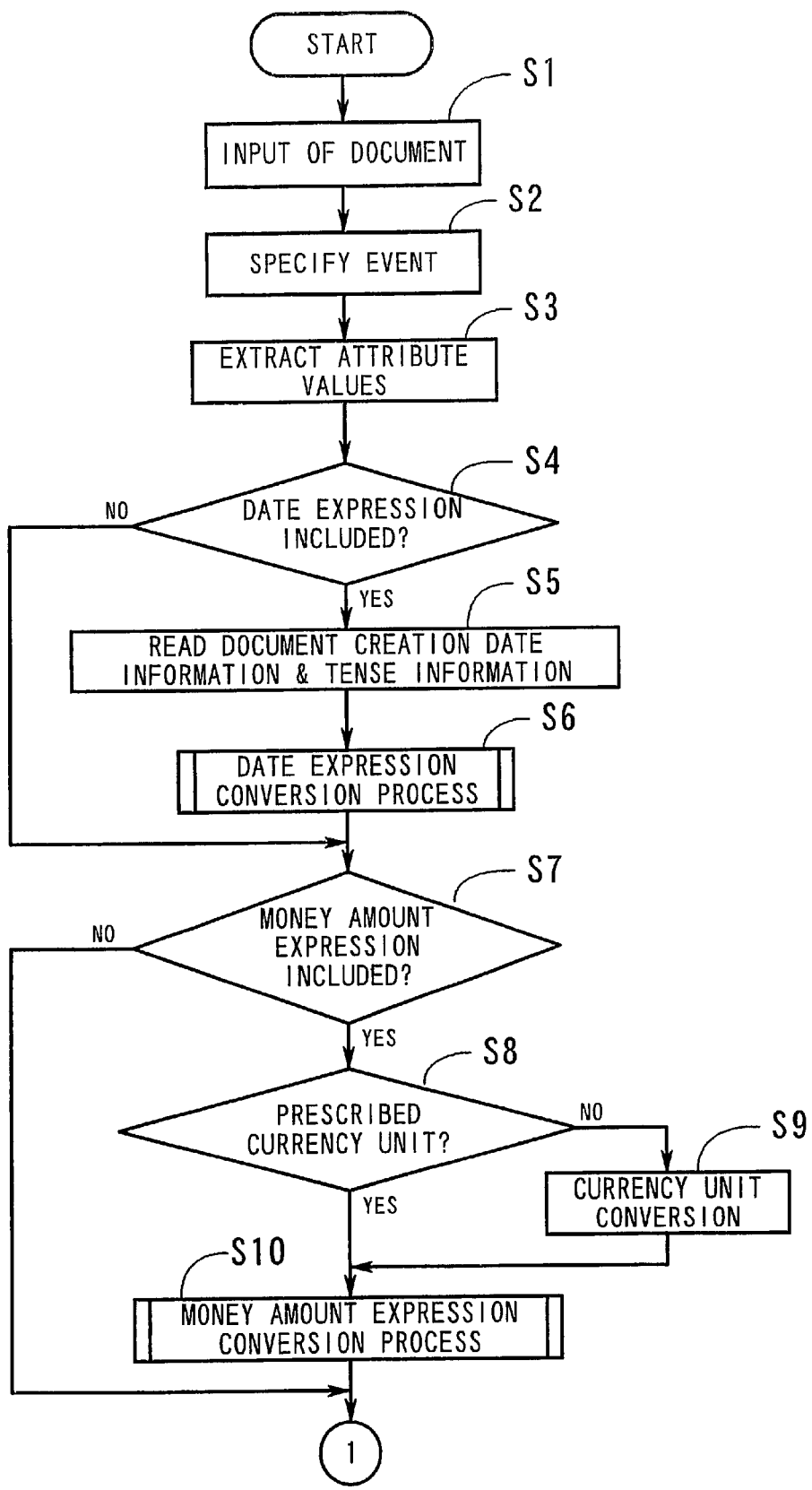
FIG. 3 is a flowchart illustrating, by way of example, a document normalization process.

FIG. 3 is a flowchart showing an example of a process executed when a new document is input via the document input section 1 (e.g., a new document is supplied from the server 23 shown in FIG. 2) in the embodiment shown in FIG. 1.

Upon start of the process shown in the flowchart, the following steps are executed.

[S1] The document input section 1 is supplied with a new document.

[S2] The event specifying means 4 specifies the type of an event described in the document.

Specifically, the event specifying means 4 looks up information (see FIG. 5) on event-expression mapping rules stored in the knowledge information storing means 3, to specify the type of the event described in the document. In the mapping rules shown in FIG. 5, a part between "module" and "end module" constitutes one event (or entity)-expression mapping rule and describes variations of expression of one event. The mapping rules shown in FIG. 5 will be described in detail later.

[S3] The attribute value extracting means 5 extracts attribute values by looking up the knowledge information stored in the knowledge information storing means 3.

For example, the attribute value extracting means 5 extracts, from the document, attribute values of attributes (e.g., <company info>, <product>, etc.) included in a definition applicable to the input document, among the variations of the event described under "module main" shown in FIG. 5, by looking up other "modules", "def's", etc. Looking up definitions described at lines 15 to 19 and at lines 12 to 14, for example, attribute values corresponding to the attribute <company info> are extracted from the document by pattern matching.

[S4] The normalizing means 8 determines whether or not a date expression is included in the extracted attribute values. If a date expression is included, the flow proceeds to Step S5; if not, the flow proceeds to Step S7.

[S5] The creation date acquiring means 6 acquires a date of creation of the document, and the tense acquiring means 7 acquires a tense of the sentence describing the event in question.

[S6] Looking up the document creation date information and tense information thus acquired, the normalizing means 8 performs a "DATE EXPRESSION CONVERSION PROCESS" to convert the date expression into corresponding numerical values.

Details of this process will be described later with reference to FIG. 6.

[S7] The normalizing means 8 determines whether or not a money amount expression is included in the extracted attribute values. If a money amount expression is included, the flow proceeds to Step S8; if not, the flow proceeds to Step S11.

[S8] The normalizing means 8 determines whether or not the money amount expression in question is in a prescribed currency unit. If the money amount expression is in the prescribed currency unit, the flow proceeds to Step S10; if not, the flow proceeds to Step S9.

Where the prescribed currency unit is "yen", for example, and if a money amount expression in the unit "$" exists, the flow proceeds to Step S9.

[S9] The unit converting means 9 reads out an exchange rate from a storage section therein, and converts the money amount expression into the prescribed currency unit.

If the expression "$100", for example, exists and if the exchange rate is "$1=130 yen", "$100" is converted to "13000 yen".

[S10] The normalizing means 8 performs a "MONEY AMOUNT EXPRESSION CONVERSION PROCESS" to convert the money amount expression into a numerical value. Details of this process will be described later with reference to FIG. 13.

In the above example, "13000 yen" (character string) is converted to "13000" (numerical value).

[S11] The normalizing means 8 determines whether or not there exists some other numerical expression. If there exists some other numerical expression, the flow proceeds to Step S12; if not, the flow proceeds to Step S13.

For example, if there exists an expression like "Number of shipment is fifty thousand sets", the flow proceeds to Step S12.

[S12] The normalizing means 8 converts the numerical expressions included in the attribute values into corresponding numerical values. In the above example, "50000" (character string) is converted to a computable numerical value of "50000".

[S13] The correlating means 10 determines whether or not a proper name (e.g., "Hashimoto Electric" etc.) is included in the attribute values. If a proper name is included, the flow proceeds to Step S14; if not, the flow proceeds to Step S15.

[S14] The correlating means 10 extracts the proper name, acquires a proper name code corresponding thereto from the knowledge information storing means 3, and assigns the acquired proper name code.

For example, a proper name code "00011" corresponding to "Hashimoto Electric" mentioned above is read out from the knowledge information storing means 3 and assigned.

The knowledge information storing means 3 stores information generated by correlating relevant proper names with one another, and accordingly, even in the case where a certain proper name in the document has a plurality of possibilities, it can be accurately specified by looking up other correlated proper names.

Specifically, in the case where the proper name "Hashimoto Electric" has two possibilities "Hashimoto Electric Corp." and "Hashimoto Electric Inc." (companies with an identical name exist), the president's name, location, etc. described in the document, for example, are compared with respective correlated proper names stored in the knowledge information storing means 3, whereby the correct proper name can be acquired by narrowing down the possibilities.

[S15] The correlating means 10 determines whether or not there exists a reference expression (expression like "the company" or "both of them"). If such a reference expression exists, the flow proceeds to Step S16; if not, the flow proceeds to Step S18.

For example, if "the company", which is a reference expression, exists, the flow proceeds to Step S16.

[S16] The correlating means 10 identifies a target which the reference expression refers to.

In the case of "Hashimoto Electric, President Nakayama announced, Hashimoto Computer, the same president, starts . . . " is identified as the target which the reference expression "the same president" refers to.

As a method for such identification, when the reference expression, such as, "the company", "the same president" is detected, the corresponding proper name preceding the expression may be identified as the target which the reference expression refers to.

[S17] The correlating means 10 acquires a proper name code corresponding to the target which the reference expression refers to, and assigns the acquired proper name code to the reference expression.

In the above example, a proper code "0001" for "President Nakayama" is assigned to the reference expression "the same president".

[S18] The correlating means 10 stores the normalized attribute values (hereinafter referred to as normalized information) and the original document (or information specifying a storage location of the original document) in the document storing means 11 in a manner associated with each other.

The above process makes it possible to specify an event described in an input document and to acquire attribute values of attributes relating to the event. Normalized information which is obtained by correlating the acquired attribute values with entities in the real world is then stored, together with the original document (or information specifying the storage location of the original document), in the document storing means 11.

The "DATE EXPRESSION CONVERSION PROCESS" appearing in Step S6 in FIG. 3 will be now described in detail.

Figure 6:
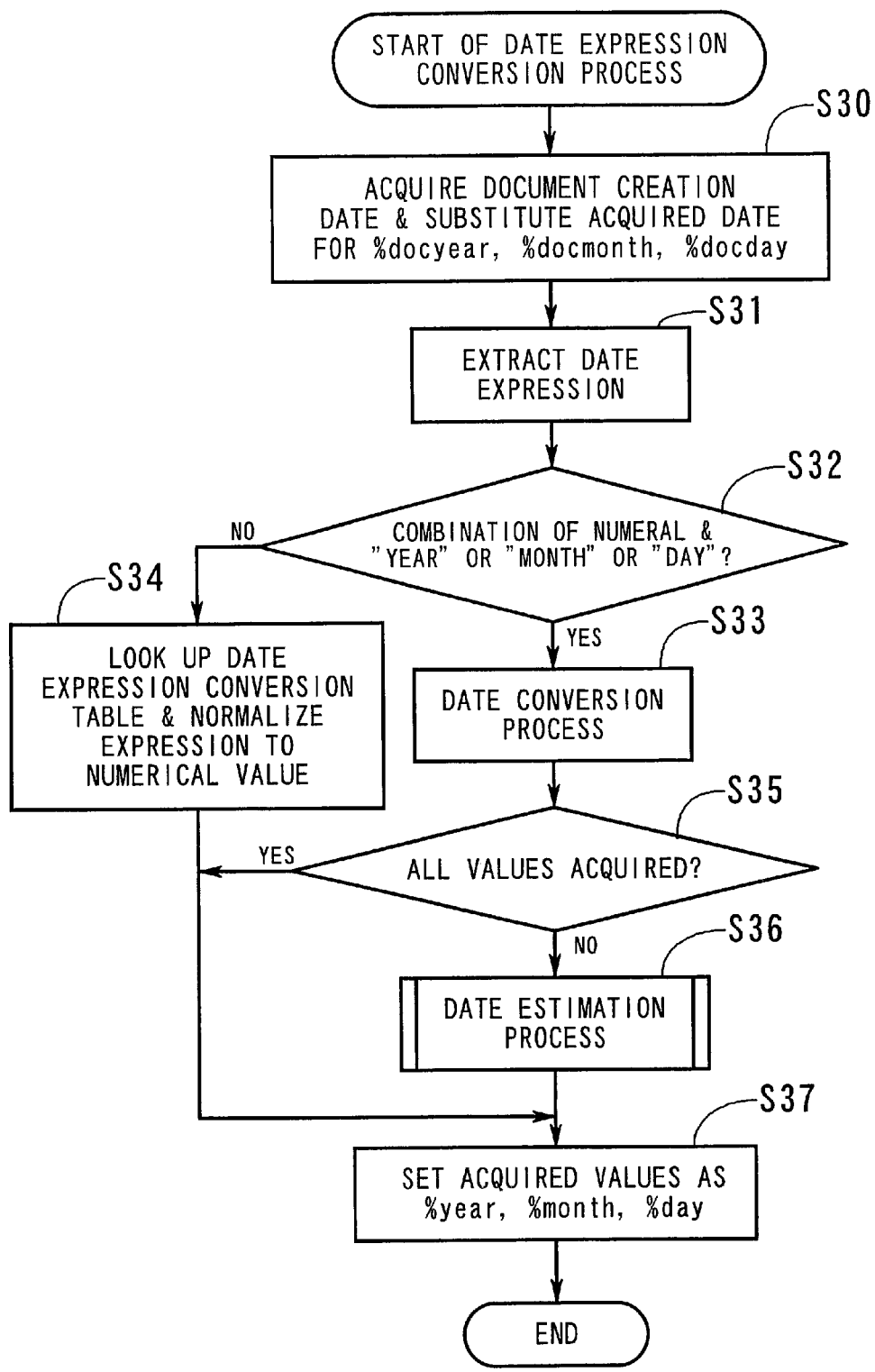
FIG. 6 is a flowchart illustrating details of a date expression conversion process appearing in FIG. 3.

FIG. 6 is a flowchart illustrating in detail the "DATE EXPRESSION CONVERSION PROCESS" appearing in FIG. 3. Upon start of the process shown in the flowchart, the following steps are executed.

[S30] The creation date acquiring means 6 acquires the date of creation of the document and substitutes the acquired date for %docyear, %docmonth, and %docday. In the case of a newspaper article, for example, the date of issue of the article is acquired as the document creation date. For documents other than the newspaper article, the creation date is acquired by looking up the file attributes.

[S31] The normalizing means 8 extracts a date expression from the attribute values.

If the sentence in question is "On the 1st Hashimoto Electric releases a new PC", for example, "the 1st" is extracted as a date expression.

[S32] The normalizing means 8 determines whether or not the extracted date expression consists of a combination of a numeral and "year" or "month" or "day". If the decision in this step is YES, the flow proceeds to Step S33; otherwise the flow proceeds to Step S34.

In the case of "1st" mentioned above, for example, accordingly, the decision in the step is YES and the flow proceeds to Step S33.

[S33] The normalizing means 8 looks up a numeral conversion table (see FIG. 7) to convert the date expression.

In the numeral conversion table shown in FIG. 7, numerical expressions are correlated with their corresponding normalized numerical values, and when a numerical expression (character string) is given, a numerical value corresponding thereto is returned.

[S34] The normalizing means 8 looks up a date expression conversion table shown in FIG. 8, to convert the date expression to corresponding numerical values.

In the date expression conversion table shown in FIG. 8, expressions are correlated with their respective types and corresponding normalized numerical values. The type is a pattern of expression; for example, "dates" indicates a specific day and "daterange" indicates a specific term. If a document created in the year 1998 includes the expression "March 4 last year", (%docyear−1)=(1998−1)=1997 is substituted for %year, and "3" and "4" are substituted for %month and %day, respectively.

Also, if a document created in 1997 includes the expression "spring of 1998", "1998" is substituted for %year, and therefore, a normalized value of "from 1998-3-1 to 1998-5-30" can be obtained.

The date expression conversion table is shown by way of example only, and it may take various other forms than the illustrated one.

[S35] The normalizing means 8 determines whether or not all values have been acquired. If it is judged that all values have been acquired, the flow proceeds to Step S37; otherwise the flow proceeds to Step S36.

For example, if all values corresponding to year, month and day have been acquired, the flow proceeds to Step S37.

[S36] The normalizing means 8 performs a date estimation process. Details of this process will be described later with reference to FIG. 9.

[S37] The normalizing means 8 substitutes the normalized numerical values for %year, %month and %day, whereupon the process is ended.

The above process makes it possible to convert date expressions included in documents to corresponding numerical values.

Figure 9:
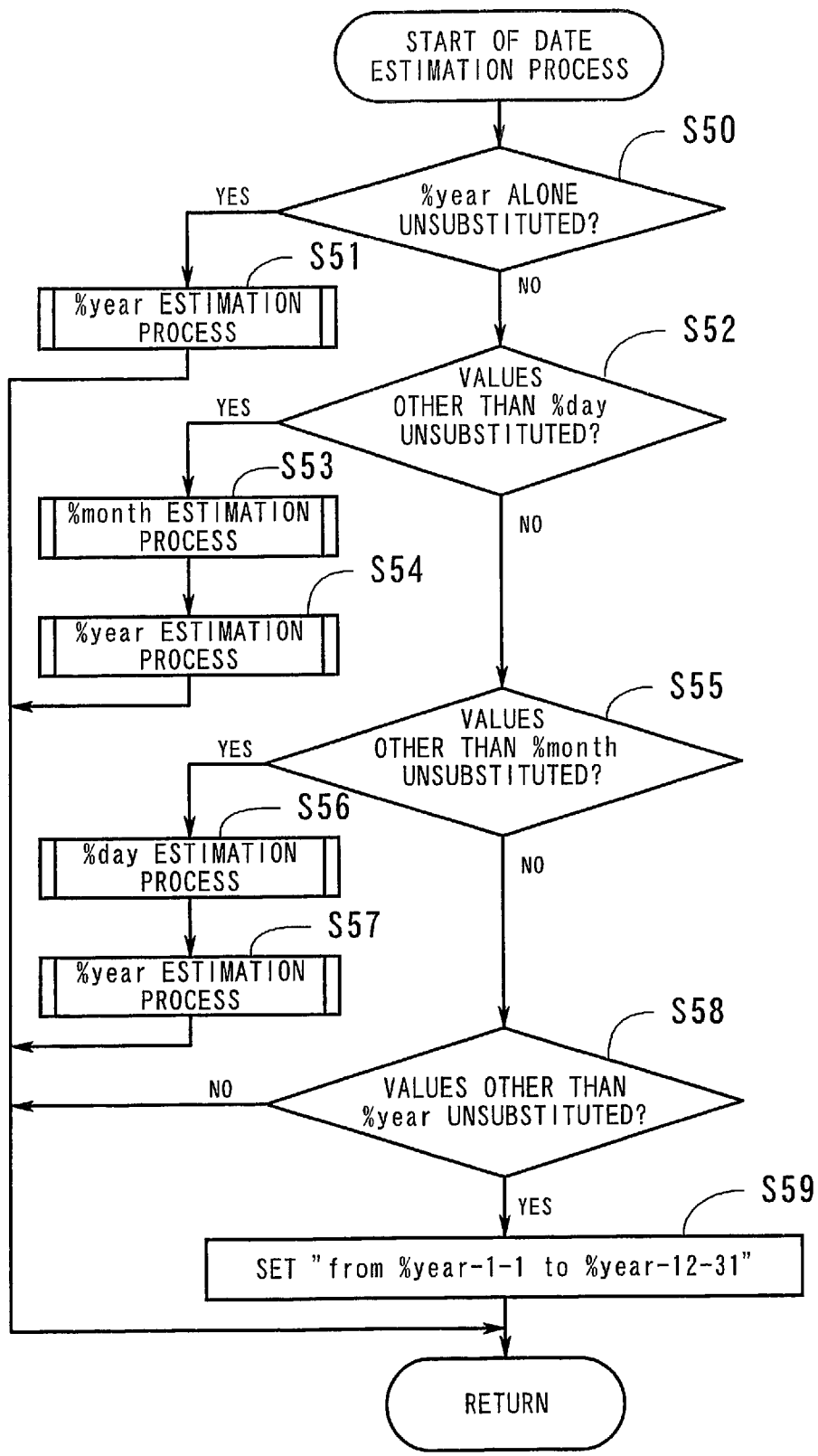
FIG. 9 is a flowchart illustrating details of a date estimation process appearing in FIG. 6.

Referring now to FIG. 9, the "DATE ESTIMATION PROCESS" appearing in Step S36 in FIG. 6 will be described in detail. Upon start of the process shown in the flowchart of FIG. 9, the following steps are executed.

[S50] The normalizing means 8 determines whether or not %year alone remains unsubstituted. If %year alone is unsubstituted, the flow proceeds to Step S51; otherwise the flow proceeds to Step S52.

[S51] The normalizing means 8 performs a %year estimation process. Details of this process will be described later with reference to FIG. 10.

[S52] The normalizing means 8 determines whether or not the values other than %day remain unsubstituted. If such values are unsubstituted, the flow proceeds to Step S53; otherwise the flow proceeds to Step S55.

[S53] The normalizing means 8 performs a %month estimation process. Details of this process will be described later with reference to FIG. 11.

[S54] The normalizing means 8 performs the %year estimation process.

[S55] The normalizing means 8 determines whether or not the values other than %month remain unsubstituted. If such values are unsubstituted, the flow proceeds to Step S56; otherwise the flow proceeds to Step S58.

[S56] The normalizing means 8 performs a %day estimation process. Details of this process will be described later with reference to FIG. 12.

[S57] The normalizing means 8 performs the %year estimation process.

[S58] The normalizing means 8 determines whether or not the values other than %year remain unsubstituted. If such values are unsubstituted, the flow proceeds to Step S59; otherwise the process is ended.

[S59] The normalizing means 8 sets "from %year-1-1 to %year-12-31" as an estimated date. Namely, in cases where the values other than %year remain unsubstituted, a normalized value is set such that the broadest possible range is covered, thereby to prevent search omission from occurring.

Figure 10:
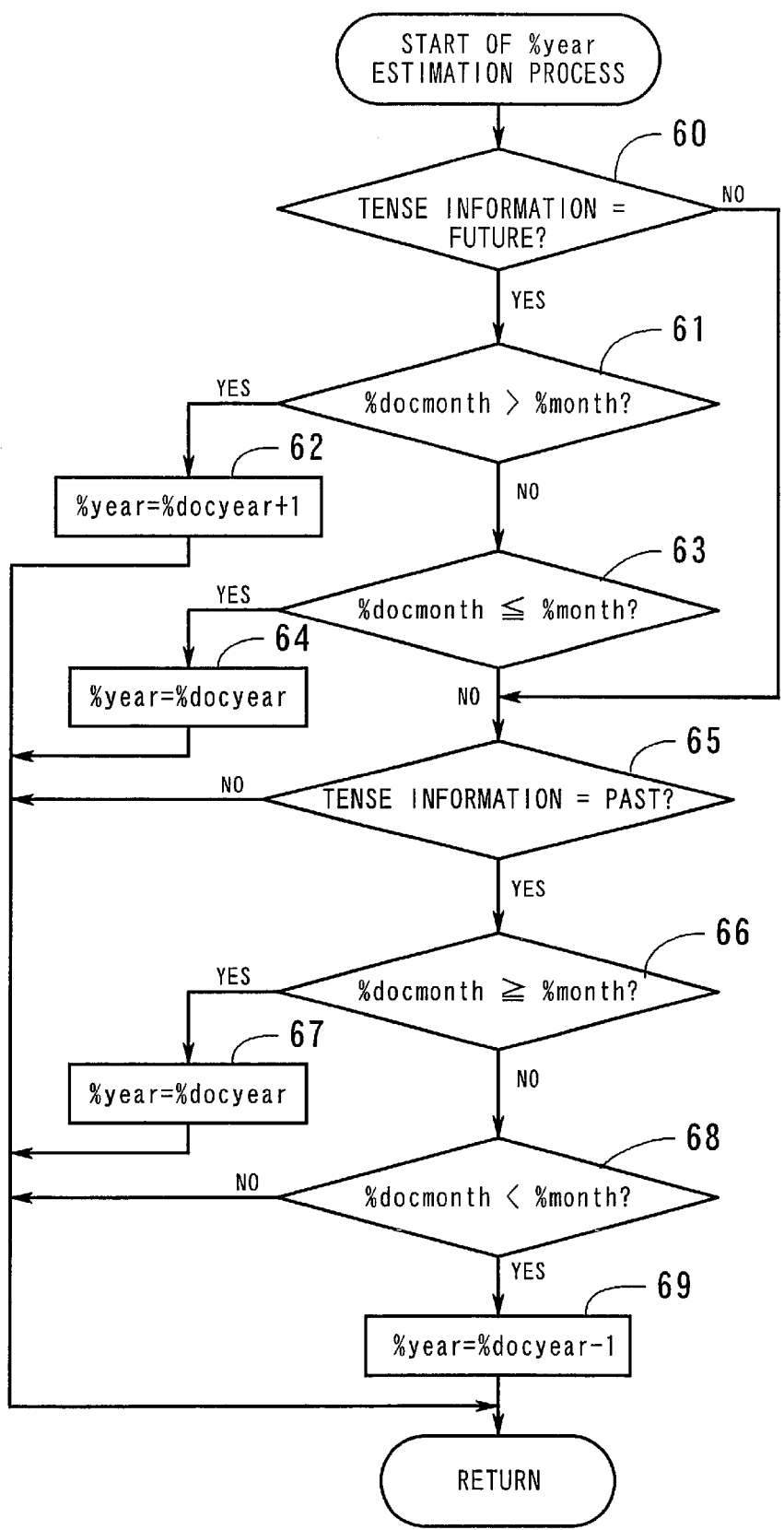
FIG. 10 is a flowchart illustrating details of a %year estimation process appearing in FIG. 9.

Referring now to FIG. 10, the "%year ESTIMATION PROCESS" appearing in Steps S51, S54 and S57 in FIG. 8 will be described in detail. Upon start of the process shown in the flowchart, the following steps are executed.

[S60] The normalizing means 8 determines whether or not the tense acquired from the target sentence by the tense acquiring means 7 is the future. If the acquired tense is the future, the flow proceeds to Step S61; if not, the flow proceeds to Step S65.

[S61] The normalizing means 8 determines whether or not %docmonth is greater than %month. If it is judged that the former is greater than the latter, the flow proceeds to Step S62; if the decision is otherwise, the flow proceeds to Step S63.

[S62] The normalizing means 8 substitutes the value (%docyear+1) for %year.

For example, where the month in which the document was created is April and if the sentence includes the expression "... is expected ... on March", "March" is estimated to be "March next year", and therefore, (%docyear+1) is substituted for %year.

[S63] The normalizing means 8 determines whether or not %docmonth shows a value smaller than or equal to %month. If the decision in this step is YES, the flow proceeds to Step S64; if the decision is otherwise, the flow proceeds to Step S65.

[S64] The normalizing means 8 substitutes the value of %docyear for %year.

[S65] The normalizing means 8 determines whether or not the tense acquired by the tense acquiring means 7 is the past. If the decision in this step is YES, the flow proceeds to Step S66; if not, the flow resumes (returns to) the process of FIG. 9.

[S66] The normalizing means 8 determines whether or not %docmonth shows a value greater than or equal to the value of %month. If the decision in this step is YES, the flow proceeds to Step S67; if not, the flow proceeds to Step S68.

[S67] The normalizing means 8 substitutes the value of %docyear for %year.

[S68] The normalizing means 8 determines whether or not the value of %docmonth is smaller than the value of %month. If the decision in this step is YES, the flow proceeds to Step S69; if not, the flow resumes the process of FIG. 9.

[S69] The normalizing means 8 substitutes the value (%docyear−1) for %year.

For example, where the month in which the document was created is April and if the sentence includes the expression "... has been ... on June.", "June" is estimated to be "June last year", and therefore, the value (%docyear−1) is substituted for %year.

Figure 11:
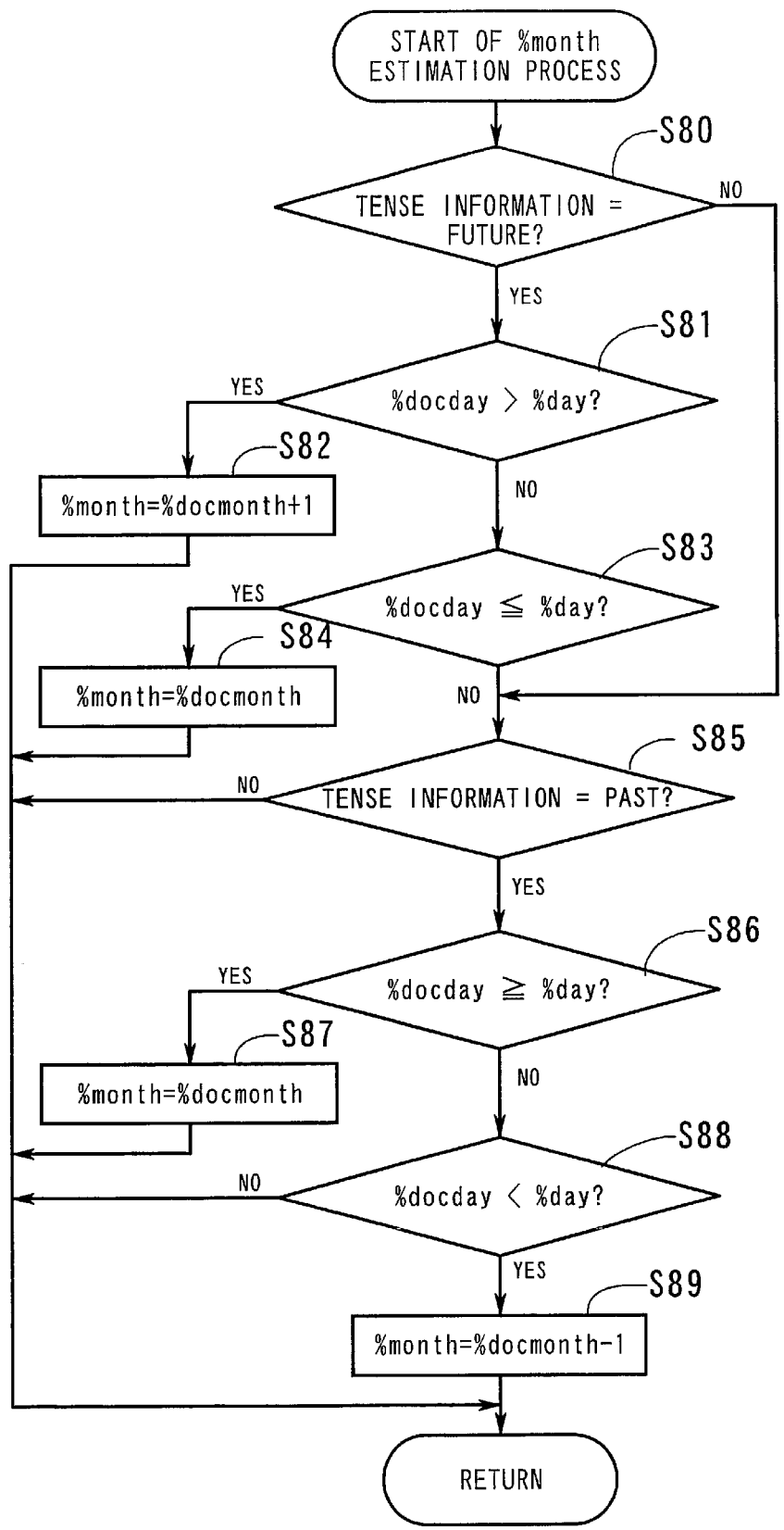
FIG. 11 is a flowchart illustrating details of a %month estimation process appearing in FIG. 9.

Referring now to FIG. 11, the "%month ESTIMATION PROCESS" appearing in Step S53 in FIG. 9 will be described in detail. Upon start of the process shown in the flowchart, the following steps are executed.

[S80] The normalizing means 8 determines whether or not the tense of the target sentence acquired by the tense acquiring means 7 is the future. If the acquired tense is the future, the flow proceeds to Step S81; if not, the flow proceeds to Step S85.

[S81] The normalizing means 8 determines whether or not %docday is greater than %day. If the decision in this step is YES, the flow proceeds to Step S82; if not, the flow proceeds to Step S83.

[S82] The normalizing means 8 substitutes the value (%docmonth+1) for %month.

For example, where the day in which the document was created is the 2nd and if the sentence includes the expression "On the 4th . . . will start . . . ", "4th" is estimated to be the "4th of the same month", and therefore, the value (%docmonth+1) is substituted for %month.

[S83] The normalizing means 8 determines whether or not %docday shows a value smaller than or equal to %day. If the decision in this step is YES, the flow proceeds to Step S84; if not, the flow proceeds to Step S85.

[S84] The normalizing means 8 substitutes the value of %docmonth for %month.

[S85] The normalizing means 8 determines whether or not the tense acquired by the tense acquiring means 7 is the past. If the decision in this step is YES, the flow proceeds to Step S86; if not, the flow resumes (returns to) the process of FIG. 9.

[S86] The normalizing means 8 determines whether or not %docday shows a value greater than or equal to the value of %day. If the decision in this step is YES, the flow proceeds to Step S87; if not, the flow proceeds to Step S88.

[S87] The normalizing means 8 substitutes the value of %docmonth for %month.

[S88] The normalizing means 8 determines whether or not the value of %docday is smaller than the value of %day. If the decision in this step is YES, the flow proceeds to Step S89; if not, the flow resumes the process of FIG. 9.

[S89] The normalizing means 8 substitutes the value (%docmonth−1) for %month.

For example, where the day in which the document was created is the 4th and if the sentence includes the expression "On the 6th, . . . have been . . . ", "6th" is estimated to be "the 6th of the previous month", and therefore, the value (%docmonth−1) is substituted for %month.

Figure 12:
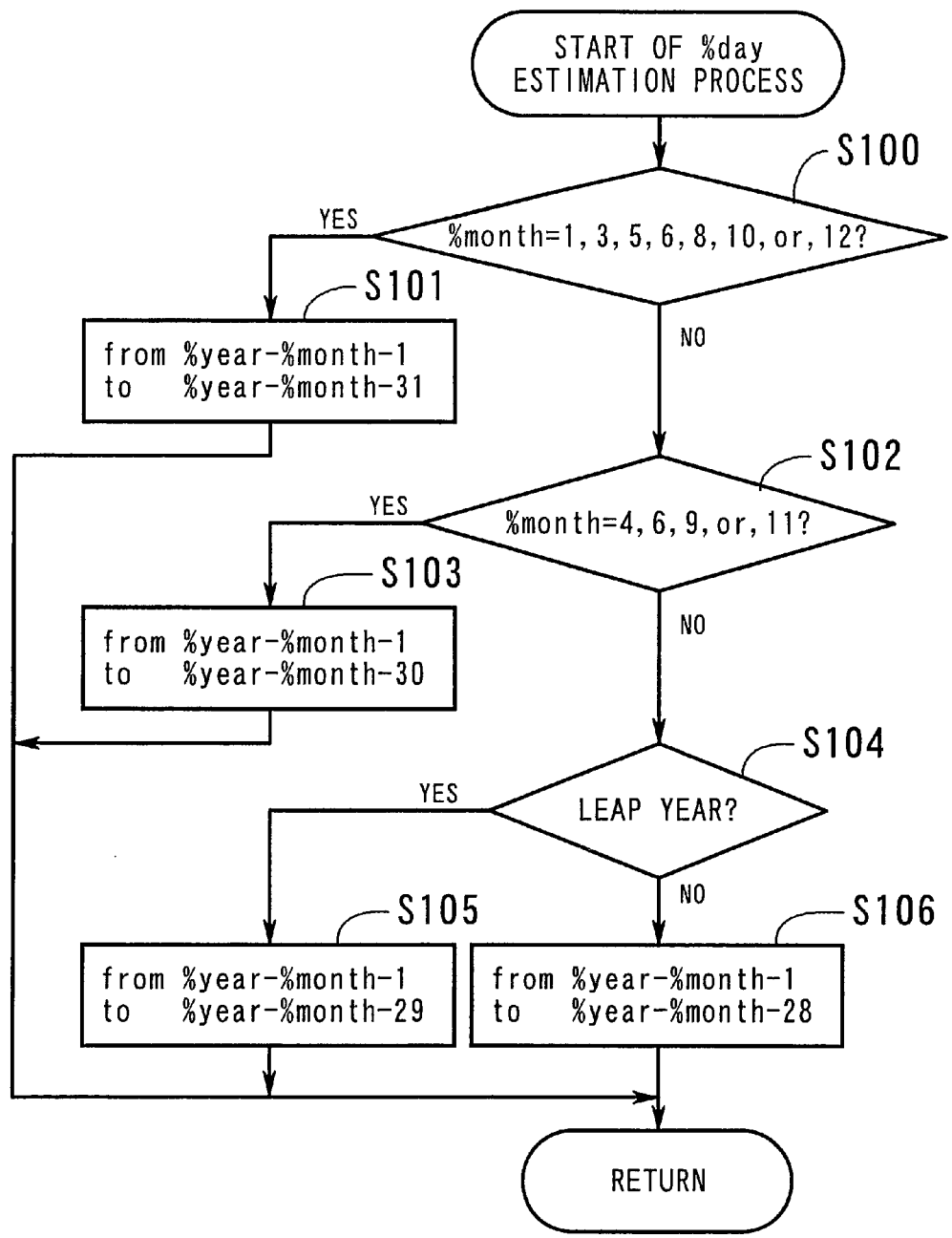
FIG. 12 is a flowchart illustrating details of a %day estimation process appearing in FIG. 9.

Referring now to FIG. 12, the "%day ESTIMATION PROCESS" appearing in Step S56 in FIG. 9 will be described in detail. Upon start of the process shown in the flowchart, the following steps are executed.

[S100] The normalizing means 8 determines whether or not the value of %month equals one of 1, 3, 5, 6, 8, 10 and 12. If the decision in this step is YES, the flow proceeds to Step S101; if not, the flow proceeds to Step S102.

[S101] The normalizing means 8 generates "from %year-%month-1 to %year-%month-31" as date information.

[S102] The normalizing means 8 determines whether or not the value of %month equals one of 4, 6, 9 and 11. If the decision in this step is YES, the flow proceeds to Step S103; if not, the flow proceeds to Step S104.

[S103] The normalizing means 8 generates "from %year-%month-1 to %year-%month-30" as date information.

[S104] The normalizing means 8 looks up the attribute value relating to "year" to determine whether or not the year in question is a leap year. If the year in question is a leap year, the flow proceeds to Step S105; if not, the flow proceeds to Step S106.

[S105] The normalizing means 8 generates "from %year-%month-1 to %year-%month-29" as date information.

[S106] The normalizing means 8 generates "from %year-%month-1 to %year-%month-28" as date information.

According to the process described above, even in the case where a document includes only insufficient date information, date information is estimated based on the document creation date and the tense of the target sentence, so that date information included in documents can be made full use of at the time of performing search.

For example, even a vague expression like "spring of next year" can be converted (normalized) to a specific numerical value (e.g., Mar. 1, 1998 to May 31, 1998), thus making it possible to use such a vague expression also for search.

Figure 13:
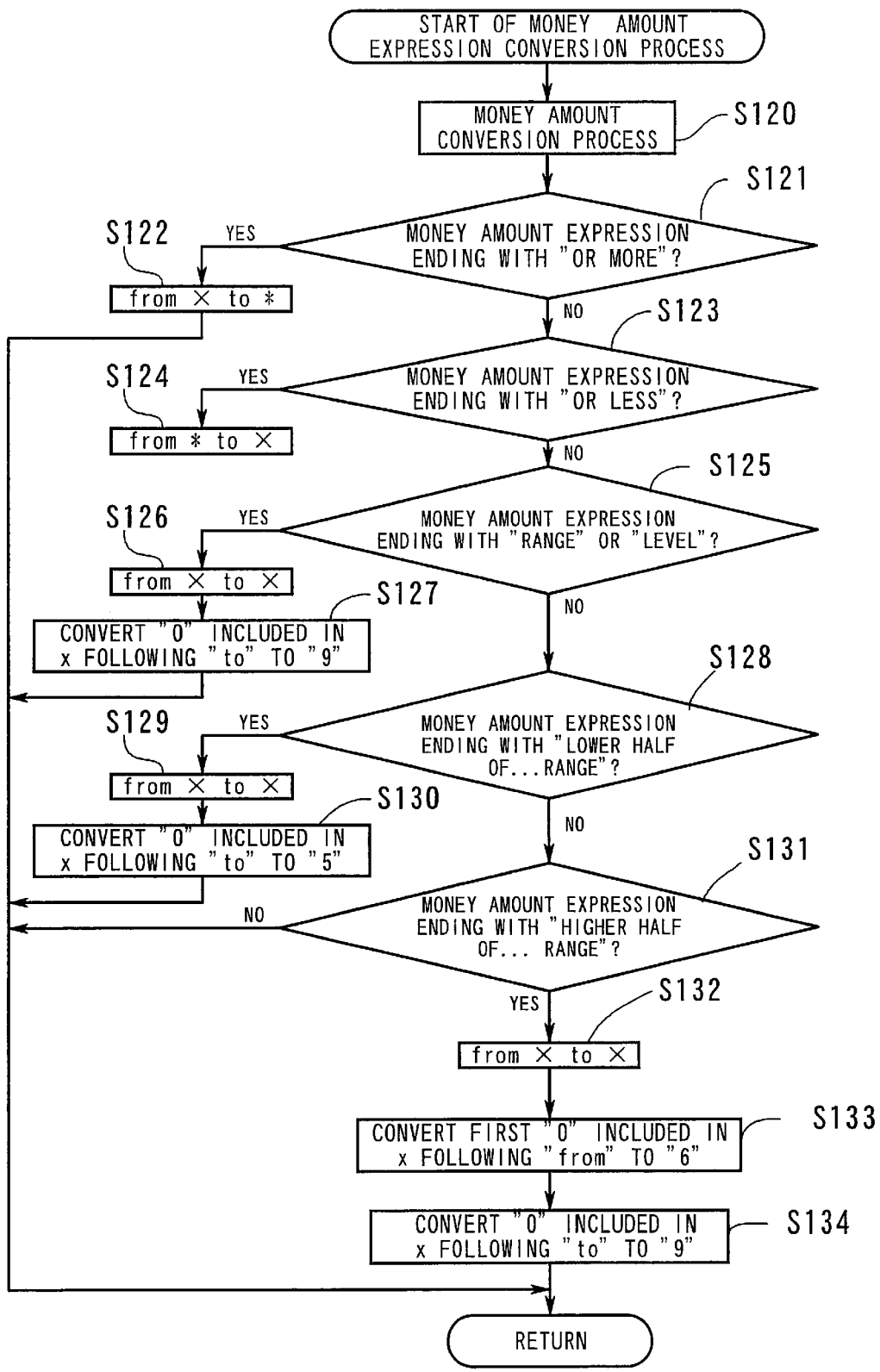
FIG. 13 is a flowchart illustrating details of a money amount expression conversion process appearing in FIG. 3.

Referring now to FIG. 13, the "MONEY AMOUNT EXPRESSION CONVERSION PROCESS" appearing in Step S10 in FIG. 3 will be described in detail. Upon start of the process shown in the flowchart, the following steps are executed.

[S120] The normalizing means 8 looks up a money amount expression conversion table shown in FIG. 14, to convert the money amount expression to a corresponding numerical value, and substitutes the value obtained for a variable x.

In the case of the expression "two hundred thousand yen", for example, "two" is first converted to "2", "hundred" is converted to "x100", and "thousand" is converted to "x1000", whereby the value "200000" is obtained as a result.

[S121] The normalizing means 8 determines whether or not the money amount expression ends with "or more". If the money amount expression ends with "or more", the flow proceeds to Step S122; if not, the flow proceeds to Step S123.

[S122] The normalizing means 8 generates "from x to *" as a normalized expression. The symbol "*" denotes an arbitrary value.

In the above example, x=2000, and therefore, "from 2000 to *" is generated.

[S123] The normalizing means 8 determines whether or not the money amount expression ends with "or less". If the money amount expression ends with "or less", the flow proceeds to Step S124; if not, the flow proceeds to Step S125.

[124] The normalizing means 8 generates "from * to x" as the normalized expression.

[S125] The normalizing means 8 determines whether or not the money amount expression ends with "range" or "level". If the money amount expression ends with "range"or "level", the flow proceeds to Step S126; if not, the flow proceeds to Step S128.

[S126] The normalizing means 8 generates "from x to x" as the normalized expression.

[S127] The normalizing means 8 converts each "0" included in x following "to" to "9".

For example, in the case of the expression "100,000 yen range (100000 to 199999 yen)", x=100000; therefore, "0's" included in x following "to⇆ are all converted to "9", providing "199999". Consequently, "from 100000 to 199999" is generated as the normalized expression.

[S128] The normalizing means 8 determines whether or not the money amount expression includes with "lower half of . . . range". If the money amount expression includes with "lower half of . . . range", the flow proceeds to Step S129; if not, the flow proceeds to Step S131.

[S129] The normalizing means 8 generates "from x to x" as the normalized expression.

[S130] The normalizing means 8 converts the first "0" included in x following "to" to "5".

For example, in the case of the expression "lower half of a hundred thousand yen range (the lower half of the 100000 to 199999 yen range)", x=100000; therefore, the first "0"

included in x following "to" is converted to "5", providing "150000". Consequently, "from 100000 to 150000" is generated as the normalized expression.

[S131] The normalizing means 8 determines whether or not the money amount expression ends with "higher half of . . . range". If the money amount expression ends with "higher half of . . . range", the flow proceeds to Step S132; if not, the flow resumes the process of FIG. 3.

[S132] The normalizing means 8 generates "from x to x" as the normalized expression.

[S133] The normalizing means 8 converts the first "0" included in x following "from" to "6".

[S134] The normalizing means 8 converts "0" included in x following "to" to "9".

For example, in the case of the expression "the higher half of a hundred thousand yen range (the higher half of the 100000 to 199999 yen range)", x=100000; therefore, the first "0" included in x following "from" is converted to "6" in Step S133 and also "0's" included in x following "to" are all converted to "9". Consequently, "from 160000 to 199999" is generated as the normalized expression.

The above process makes it possible to convert money amount expressions, for example, to corresponding numerical values and also to convert vague money amount expressions including "or more" or "the lower half of . . . range", for example, to corresponding numerical values.

Taking a specific example, the operation of the above embodiment will be explained.

Let it be assumed that a document shown in FIG. 15 is input via the document input section 1 shown in FIG. 1. The example document shown in FIG. 15 relates to release of new products.

After a document like the illustrated one is input via the document input section 1, the event specifying means 4 looks up the knowledge information stored in the knowledge information storing means 3, to specify the event described in the document (Step S2 in FIG. 3).

The example shown in FIG. 15 corresponds to the first item (<company info> released <product> <date>) in "module main" described at lines 4 to 9 in FIG. 5. Accordingly, the event described in this document is judged to be "release of new product".

In the knowledge information shown in FIG. 5, event definitions are described in a part between "module main" and "endmodule". The attributes included in the event definitions, such as <company info>, are defined under "module" or "def". For example, the attribute <company info> is defined under "module" at lines 15 to 19 and contains three definitions, that is, (<business category>, <company name>), (<business category 2> & connective; <company name>), and (<company name>).

The definition of <business category> is described following "def" at line 12, and an applicable one among (maker of .*, company of .*, major company of .*, developer of .*, retailer of .*, manufacturer of .*) is selected as the attribute value of the attribute <business category>. Accordingly, the expression like "maker company of a PC" or "major PC company" is judged to be an attribute value of <business category>. The symbol "|" represents "or".

Where synonym is to be included in definition, a portion in which a synonym is to be included is interposed between "&" and ";", as indicated at line 17. In the illustrated example, "connective" corresponds to the portion in which a synonym is to be included and is defined in detail at line 16, as "connective"=(specializing in|which produces|the maker of). Accordingly, "Hashimoto Electric specializing in office automation" comes under the second definition (<company name> & connective; <business category 2>) of company information.

Thus, in this embodiment, processing is performed in a top-down fashion, enabling pattern matching suited to context.

After the event type is specified by the above process, the tense acquiring means 7 acquires the sentence describing the event to obtain tense information thereof. In the example document shown in FIG. 15, the tense is the past ("released"), "past tense" is acquired as the tense information. The tense acquired in this manner is attached to the normalized information as "aspect=past", as indicated at line 2 in FIG. 16.

Subsequently, the attribute value extracting means 5 extracts attribute values (Step S3 in FIG. 3) according to the specified event type. Specifically, the attribute value extracting means 5 extracts attribute values by performing pattern matching between the knowledge information shown in FIG. 5 and the document.

In the example shown in FIG. 15, "Hashimoto Electric" is extracted as <organization name>, "JCN compatible PC" is extracted as <type> in <product info> about newly released products, and "GNW Series" is extracted as <product name>.

The normalizing means 8 then determines whether or not a date expression exists in the document (Step S4 in FIG. 3). If a date expression exists, it is converted to a corresponding numerical value.

The document shown in FIG. 15 includes the expression "18th"; therefore, the normalizing means 8 acquires the document creation date information and the tense information in Step S5 in FIG. 3, and performs the date expression conversion process in Step S6.

If the document creation date is "Oct. 19, 1993", for example, information "release date" specifying "date" as its type and "1993-10-18" as its value is attached to the normalized information, as indicated at line 6 in FIG. 16. Subsequently, in Step S7 in FIG. 3, the normalizing means 8 determines whether or not a money amount expression exists. The document shown in FIG. 15 includes expressions such as "one hundred seventy eight thousand yen", and therefore, Step S8 is executed to determine whether or not the money amount expression is in the prescribed currency unit. For example, if the prescribed currency unit is "yen" and the expression in question is "one hundred seventy eight thousand yen", Step S10 is executed.

If an expression such as $150" is included, currency unit conversion is performed according to the exchange rate ($1=130 yen) in Step S9, and then Step S10 is executed.

In Step S10,the character string "one hundred seventy eight thousand yen" is converted to the value "178000".

Subsequently, in Step S11, it is determined whether or not other numerical expressions exist. In the example shown in FIG. 15, however, the first sentence includes no other numerical expression than the date expression, and therefore, Step S13 is executed.

In Step S13, the correlating means 10 determines whether or not a proper name exists. In the example of FIG. 15, the proper name "Hashimoto Electric" exists; accordingly, Step S14 is executed.

In Step S14, the correlating means 10 acquires information associated with Hashimoto Denki, from among the knowledge information stored in the knowledge information storing means 3. The acquired information is, for example, as follows:

0001 Hashimoto Electric <company name>
00011 Hashimoto Taro <president name>
00012 Okayama prefecture <location>

If there are a plurality of possibilities for "Hashimoto Electric", it is determined whether or not the document includes other proper names (Hashimoto Taro, Okayama prefecture) that are stored in association with Hashimoto Electric, to narrow down the possibilities.

Then, in Step S14, a proper name code (e.g., 0001) obtained as a result of narrowing is attached to the normalized information (see line 4 in FIG. 16).

The correlating means 10 then determines in Step S15 whether or not a reference expression exists. In the example shown in FIG. 15, no reference expression exists, and thus the decision in this step is NO. Accordingly, in Step S18, the generated normalized information and the document (or information specifying the storage location of the document) are stored in the document storing means 11, and the process is ended.

FIG. 17 shows another example document, and FIG. 18 shows an example of normalized information obtained by processing the document shown in FIG. 17.

As indicated at line 3 in FIG. 18, the event described in the document shown in FIG. 17 is merger information (field=merger information) and the tense is the past (aspect=past). Also, since the first sentence does not include the expression "announced", "sentence end expression=predicate announce absent" is described at line 2.

As the contents of "merging entity organization info" at lines 5 to 30, Hokkaido Ohki Lift and Higashi Hokkaido Ohki Lift are specified at lines 8 and 18 as merging organizations and <merging organization supplementary info> supplementary to the information on these organizations is described at the remaining lines.

At line 36 and the subsequent lines are described the remaining sentences except the sentence which was subjected to analysis.

In this example, the reference expression "the same president" appears at line 4 in FIG. 17. Accordingly, the description "reference target=previous" is added, as indicated at line 25 in FIG. 18, thereby specifying that the reference expression "the same president" refers to "Akutagawa Ryutaro (0251)" (element 2) at lines 15 to 17.

The following explains an example of a process for retrieving documents by looking up the normalized information generated as described above.

FIG. 19 shows an example of an input screen displayed at the user interface section 2 shown in FIG. 1. In the illustrated example, documents including sales information on products are searched for. Namely, search is performed for documents describing <sales of product> as their event. In this example, the name of an organization which released products is entered in the uppermost box "Organization name:". In the next box "Product type:", a type of products is entered. Further, a price range of products is entered in the boxes "Price:", and a release date range is entered in the boxes "Release date:". The button "Search" shown at the bottom is operated to start search after all items have been input.

FIG. 20 shows an example of a query input in the screen shown in FIG. 19. In the illustrated example, "AAA" is input as the organization name and "PC" is input as the product type.

Further, the range from "100000" yen to "300000" yen is specified as the price, and the range from "1997" (year) "1" (month) "1" (day) to "1997" (year) "6" (month) "30" (day) is specified as the release date.

The query thus entered from the input screen is assigned information indicative of attributes of the individual input items, and then supplied to the document extracting means 12 via the event specifying means 4, the attribute value extracting means 5, and the correlating means 10. As such information to be assigned, "AAA", for example, is assigned a tag <organization name>. Also, the price is converted into a tag <price type=price unit=yen value="from 100000 to 300000">, and the release date is converted into a tag <release date type=date value="from 1997-1-1 to 1997-6-30">.

The document extracting means 12 extracts, from the document storing means 11, documents having attribute values matching the tags of the query supplied from the user interface section 2. Specifically, since the document storing means 11 stores the normalized information together with the original documents, the document extracting means 12 collates the attribute values included in the normalized information with the tags of the query and extracts matching documents.

The results of the search thus performed are output and displayed at a display device, not shown.

FIG. 21 shows a screen template for displaying search results. The illustrated example includes, as attribute values, "Organization name", "Product type", "Product name", "Price", "Release date" and "Heading" to show search results.

FIG. 22 shows an example of an actually displayed screen. In this example, the item at line 1 indicates that the organization "AAA" released desktop personal computers priced in the 200000 to 299999 yen range on 1997/02/29 and that the heading of the document concerned is "Low price PC released".

FIG. 23 shows another example of an input screen displayed at the user interface section 2 appearing in FIG. 1. In this example, search is performed for documents including "Organization Merger Information". Specifically, documents describing merger of organizations as their event are searched for. In the illustrated example, the names of organizations to be merged are input in the first and second boxes "Organization name:". In the boxes "Merger date:", a range of merger date is input. The button "Search" at the bottom is operated to start search after all items have been entered.

FIG. 24 shows an example of a query input in the screen shown in FIG. 23. In the illustrated example, "AAA" is input as the organization name, and the range from "1997" (year) "1" (month) "1" (day) to "1997" (year) "12" (month) "31" (day) is input as the range of merger date.

With these items entered in the input screen, the button "Search" is operated, whereupon tags are generated in the same manner as described above, and are collated with the normalized information stored in the document storing means 11 to search for documents.

FIG. 25 shows a screen template for displaying search results of the query shown in FIG. 24. The illustrated example includes, as attribute values, "Organization name", "Organization name", "New organization name", "Merger date" and "Heading" to show search results.

FIG. 26 shows an example of an actually displayed screen.

In the illustrated example, the document retrieved indicates that the companies with the organization names "AAA" and "BBB" merged on "1997/04/01" into one company with the new organization name "CCC", and the heading of the document is "AAA, BBB, merges".

In the embodiment described above, input screens suited to events to be searched are prepared, and required items are input from the input screens, so that desired documents can be acquired. As mentioned above, documents are stored in the document storing means 11 in a manner associated with their normalized information. Accordingly, even in the case where a document describes the price of a newly released personal computer in alphabetic characters "two hundred fifty thousand yen", the document can be acquired by looking up its normalized information by means of a query specifying the range from "200000" yen to "300000" yen.

In the above embodiment, predetermined items are input from the input screen suited to the event to be searched, and documents matching the input items are searched for.

Alternatively, a query may be input in the form of a sentence, and after the input sentence is normalized, matching documents may be searched for. An example of such a process for normalizing a query will be now described with reference to the flowchart of FIG. 27. Upon start of the process shown in the flowchart, the following steps are executed:

[S151] The user interface section 2 is supplied with a query described in the form of a sentence.

[S152] The event specifying means 4 specifies the type of an event described in the query. Specifically, the event specifying means 4 looks up the information (see FIG. 5) on the event-expression mapping rules stored in the knowledge information storing means 3, to specify the type of the event described in the query.

[S153] The attribute value extracting means 5 extracts attribute values by looking up the knowledge information stored in the knowledge information storing means 3.

[S154] The normalizing means 8 determines whether or not a date expression is included in the extracted attribute values. If a date expression is included, the flow proceeds to Step S155; if not, the flow proceeds to Step S157.

[S155] The creation date acquiring means 6 acquires a date of creation of the query, and the tense acquiring means 7 acquires a tense of the query.

[S156] Looking up the query creation date information and tense information thus acquired, the normalizing means 8 performs the "DATE EXPRESSION CONVERSION PROCESS" to convert the date expression into corresponding numerical values. This process was already explained in detail with reference to FIG. 6, and therefore, description thereof is omitted here.

[S157] The normalizing means 8 determines whether or not a money amount expression is included in the extracted attribute values. If a money amount expression is included, the flow proceeds to Step S158; if not, the flow proceeds to Step S161.

[S158] The normalizing means 8 determines whether or not the money amount expression in question is in a prescribed currency unit. If the money amount expression is in the prescribed currency unit, the flow proceeds to Step S160; if not, the flow proceeds to Step S159. Where the prescribed currency unit is "yen", for example, and if a money amount expression in the unit "$" exists, the flow proceeds to Step S159.

[S159] The unit converting means 9 reads out an exchange rate from the storage section therein, and converts the money amount expression into the prescribed currency unit.

If the expression "$100", for example, exists and if the exchange rate is "$1=130 yen", "$100" is converted to "13000 yen".

[S160] The normalizing means 8 performs the "MONEY AMOUNT EXPRESSION CONVERSION PROCESS" to convert the money amount expression into a numerical value. This process was already explained in detail with reference to FIG. 13; therefore, description thereof is omitted here.

In the above example, "13000 yen" (character string) is converted to "13000" (numerical value).

[S161] The normalizing means 8 determines whether or not there exists some other numerical expression. If there exists some other numerical expression, the flow proceeds to Step S162; if not, the flow proceeds to Step S163.

For example, if there exists an expression like "number of shipping fifty thousand sets", the flow proceeds to Step S162.

[S162] The normalizing means 8 converts the numerical expressions included in the attribute values into corresponding numerical values. In the above example, the character string "50000" is converted to a computable numerical value of "50000".

[S163] The correlating means 10 determines whether or not a proper name (e.g., "Hashimoto Electric" etc.) is included in the attribute values. If a proper name is included, the flow proceeds to Step S164; if not, the flow proceeds to Step S165.

[S164] The correlating means 10 extracts the proper name, acquires a proper name code corresponding thereto from the knowledge information storing means 3, and assigns the acquired proper name code to the corresponding attribute value.

For example, a proper name code "00011" corresponding to "Hashimoto Electric" mentioned above is read out from the knowledge information storing means and assigned.

The knowledge information storing means 3 stores information generated by correlating relevant proper names with one another, and accordingly, even in the case where a certain proper name has a plurality of possibilities, it can be accurately specified by looking up other correlated proper names.

Specifically, in the case where the proper name "Hashimoto Electric" has two possibilities "Hashimoto Electric Corp." and "Hashimoto Electric Inc." (companies with an identical name exist), the president's name, location, etc. described in the query, for example, are compared with respective correlated proper names stored in the knowledge information storing means 3, whereby the correct proper name can be acquired by narrowing down the possibilities.

[S165] The correlating means 10 determines whether or not there exists a reference expression (expression like "the company" or "both of them"). If such a reference expression exists, the flow proceeds to Step S166; if not, the flow proceeds to Step S168.

For example, if "the company", which is a reference expression, exists, the flow proceeds to Step S166.

[S166] The correlating means 10 identifies a target which the reference expression refers to.

In the case of "Hashimoto Electric, President Nakayama announced, Hashimoto Computer, the same president, starts . . . " is identified as the target which the reference expression "the same president" refers to.

As a method for such identification, when the reference expression, such as, "the company", "the same president" is detected, the corresponding proper name preceding the expression may be identified as the target which the reference expression refers to.

[S167] The correlating means 10 acquires a proper name code corresponding to the target which the reference expression refers to, and assigns the acquired proper name code to the reference expression.

In the above example, a proper code "00010" for "President Nakayama" is assigned to the reference expression "the same president".

[S168] The correlating means 10 supplies normalized query information generated in this manner to the document extracting means 12. Consequently, looking up the thus-generated normalized query information, the document extracting means 12 searches the documents stored in the document storing means 11.

For example, in the case where "Hashimoto Shuzo released Sake Hashimoto." has been input as a query, the event specifying means 4 looks up the knowledge information stored in the knowledge information storing means 3, and judges that the input query describes the event "release of new product".

The attribute value extracting means 5 extracts "Hashimoto Shuzo" as <organization name>, "sake" as <product type>, and "Hashimoto" as <product name>. The correlating means 10 acquires and assigns a proper name code corresponding to "Hashimoto Shuzo", if any. If the proper name code for "Hashimoto Shuzo" is "0111", for example, a tag <organization name> Hashimoto Shuzo (0111) </organization name> is generated.

The document extracting means 12 looks up the normalized information generated in the above manner, to extract matching documents from the document storing means 11. Specifically, the document extracting means 12 extracts, from the document storing means 11, documents which include "Hashimoto Syuzo" applied with organization name tag and the proper name code (0111), "Hashimoto" applied with product type tag, and "Hashimoto" applied with product name tag and of which the event is "release of new product".

This process prevents a document including a sentence "Mr. Hashimoto ordered sake produced by Hashimoto Shuzo.", for example, from being retrieved as a result of search. Namely, since the query and the normalized information of documents are individually applied with tags indicative of extracted attributes, it is possible to prevent "Hashimoto" as <product name> from being confused with "Hashimoto" as <person name>.

Figure 29:
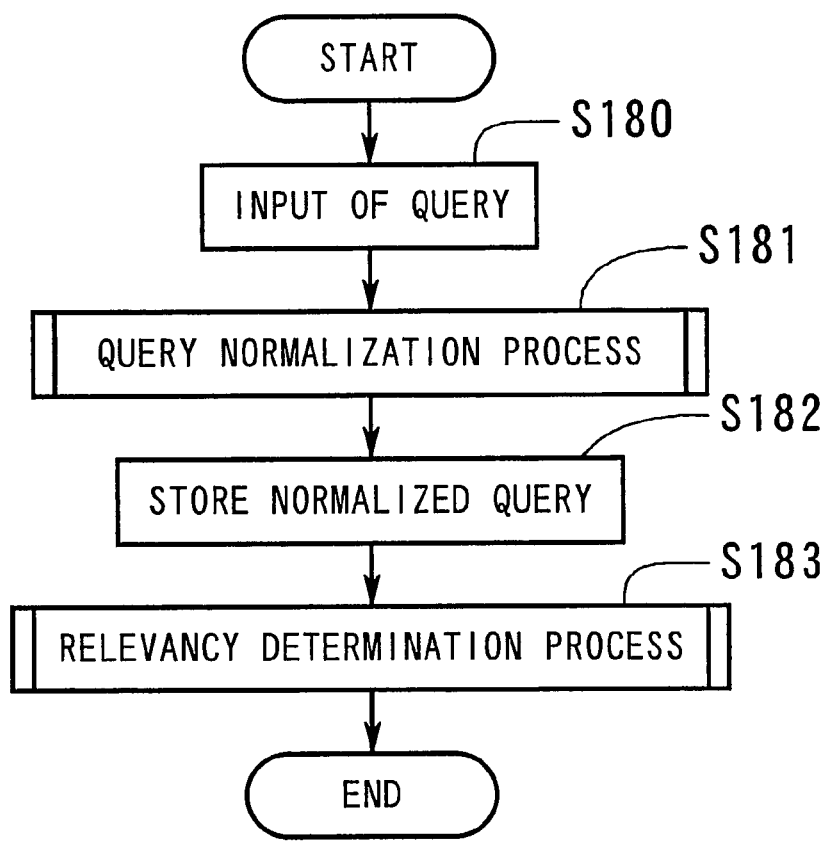
FIG. 29 is a flowchart illustrating an example of processing a query from a user when documents are to be clipped.

The following describes an example of a process of clipping documents according to the above embodiment. FIG. 29 is a flowchart exemplifying a process of normalizing a query transmitted from a user when documents are to be clipped. Upon start of the process shown in the flowchart, the following steps are executed.

[S180] The user interface section 2 is supplied with a query from a certain user.

Figure 27:
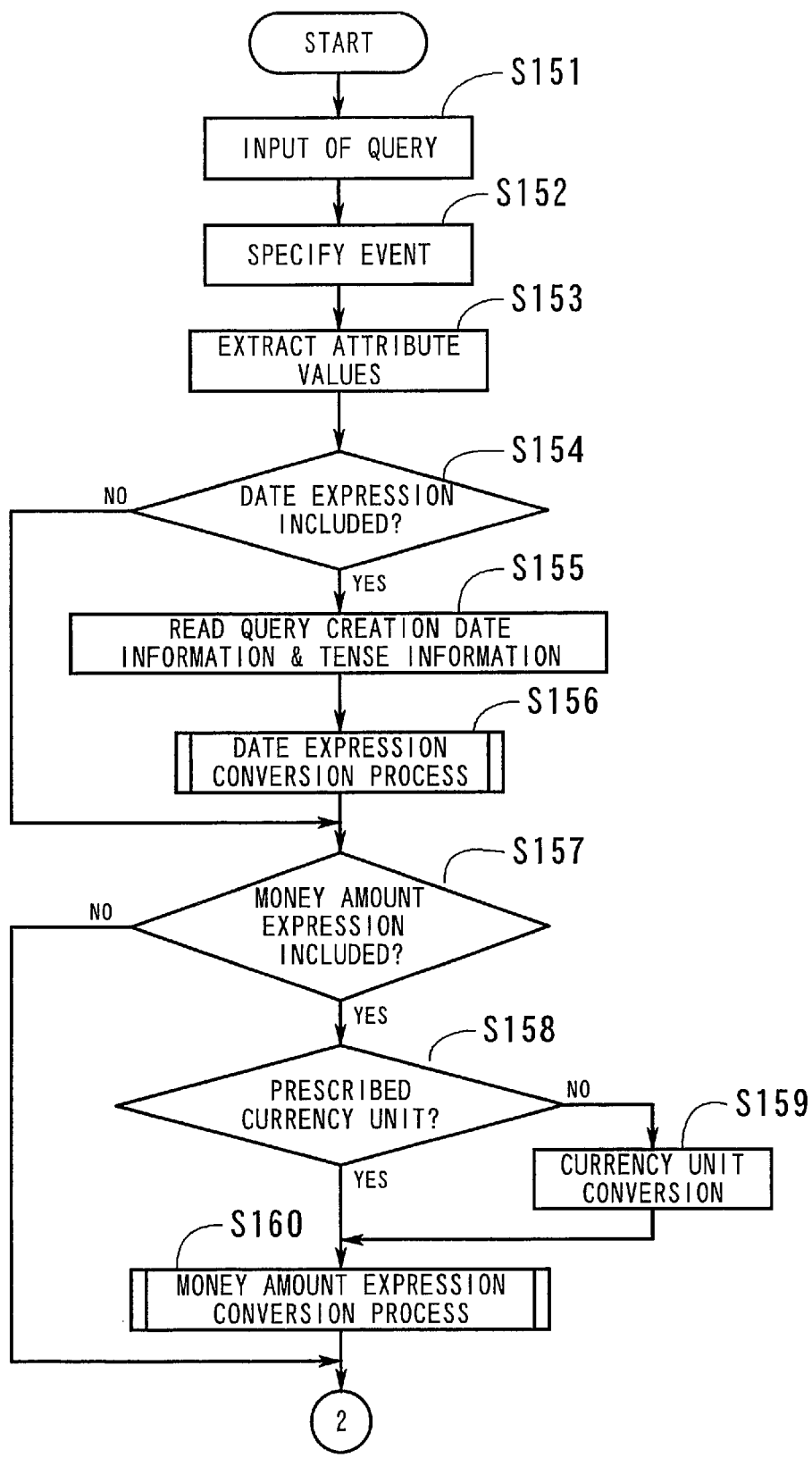
FIG. 27 is a flowchart illustrating a query normalization process, by way of example.
Figure 28:
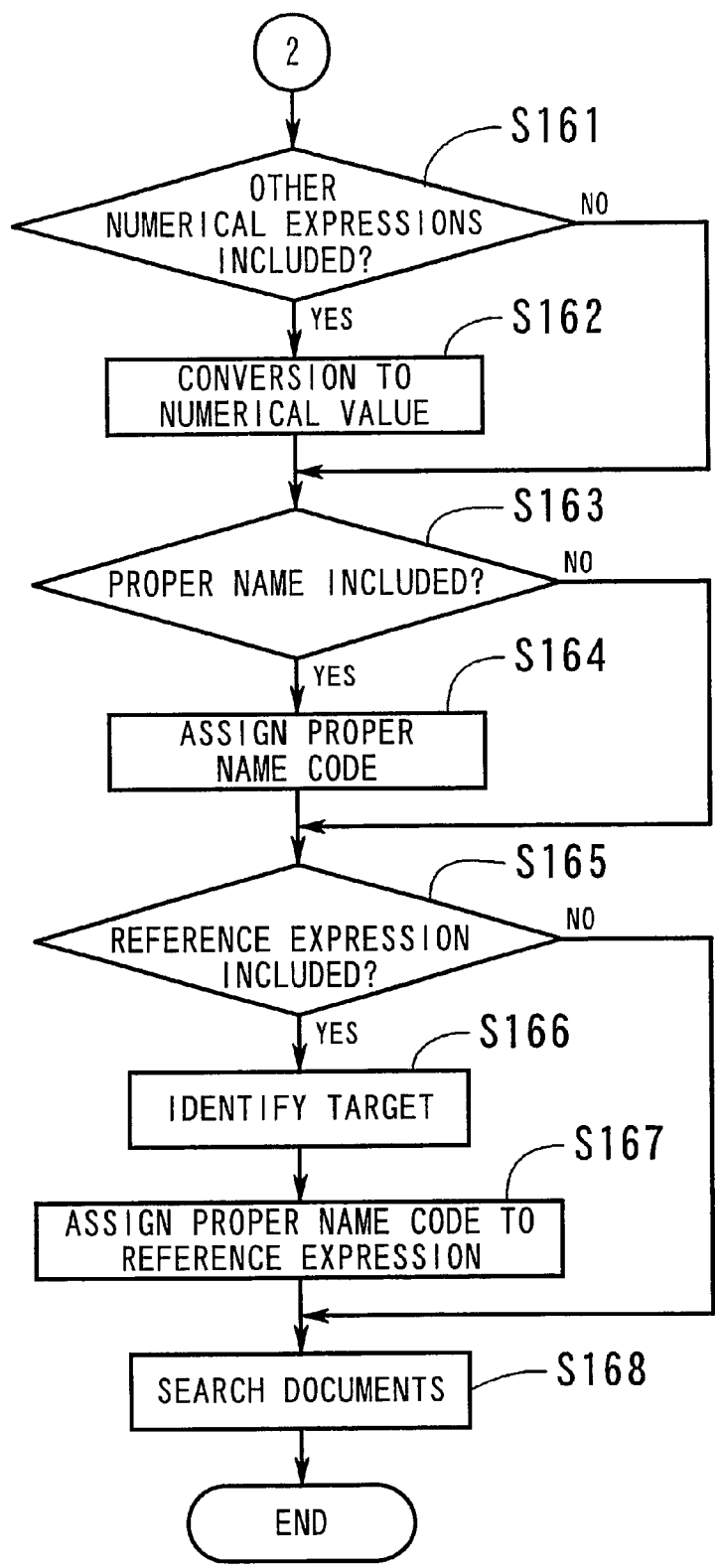
FIG. 28 is a flowchart also illustrating the query normalization process.

[S181] The event specifying means 4, the attribute value extracting means 5 and the correlating means 10 perform the process of Steps S151 through S167 shown in FIGS. 27 and 28, to normalize the query.

[S182] The document extracting means 12 stores the thus-normalized query (normalized information) and information specifying the user who transmitted the query, in a manner associated with each other.

[S183] The document extracting means 12 and the importance calculating means 13 perform a "RELEVANCY DETERMINATION PROCESS" to determine the degree of relevancy between the query from each user and the documents stored in the document storing means 11. This process will be described in detail below with reference to FIG. 30.

Figure 30:
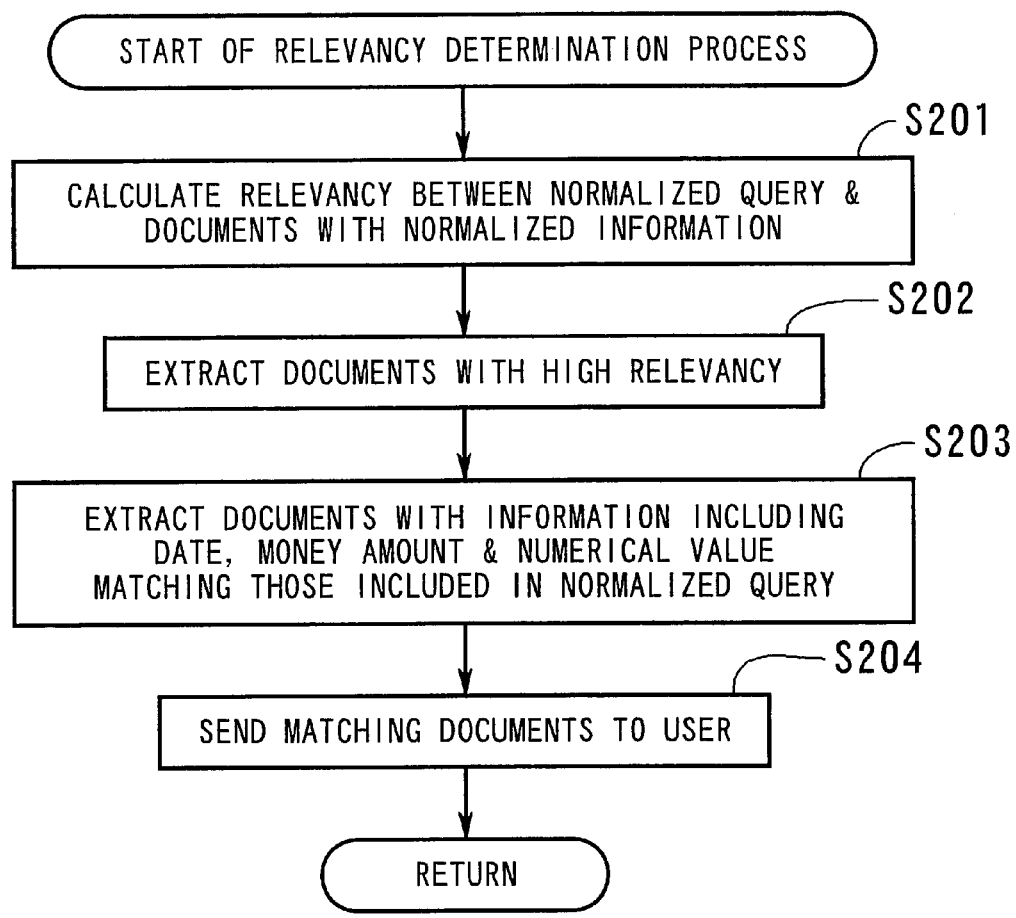
FIG. 30 is a flowchart illustrating details of a relevancy determination process appearing in FIG. 29.

Referring to FIG. 30, details of the "RELEVANCY DETERMINATION PROCESS" appearing in FIG. 29 will be described. Upon start of the process shown in the flowchart, the following steps are executed.

[S201] The importance calculating means 13 calculates, with respect to each user, the degree of relevancy between the normalized query and documents with normalized information.

To calculate the degree of relevancy, a method may be employed in which target documents are scored in accordance with how many important expressions appearing in the normalized query are included in the documents, for example, and documents scored high are judged to documents with high relevancy.

[S202] Looking up the results of calculation by the importance calculating means 13, the document extracting means 12 extracts documents with high relevancy.

[S203] The document extracting means 12 extracts documents whose normalized information includes a date, money amount and numerical value matching those included in the normalized query.

[S204] The document extracting means 12 transmits the matching documents to the user through the network 21.

Figure 31:
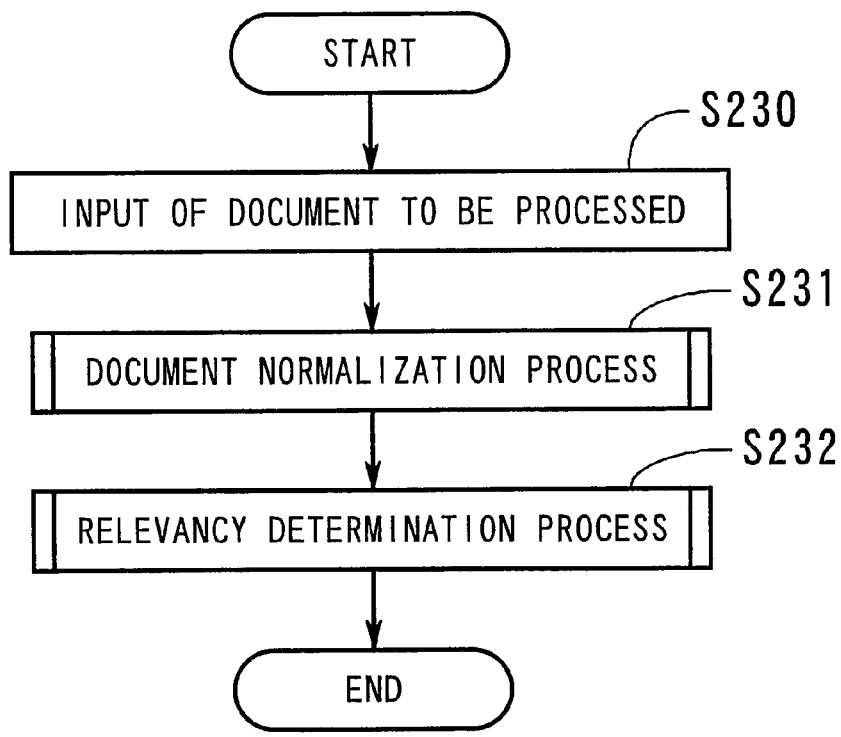
FIG. 31 is a flowchart illustrating an example of document processing executed when documents are to be clipped.

Referring now to FIG. 31, an example of a process executed in the document processing system 20 when a new document is transmitted from the server 23, for example, will be described.

Upon start of the process shown in the flowchart, the following steps are executed.

[S230] The document input section 1 receives a new document supplied thereto from the server 23, for example, through the network 21.

[S231] The event specifying means 4, the attribute value extracting means 5 and the correlating means 10 perform the document normalization process.

Figure 4:
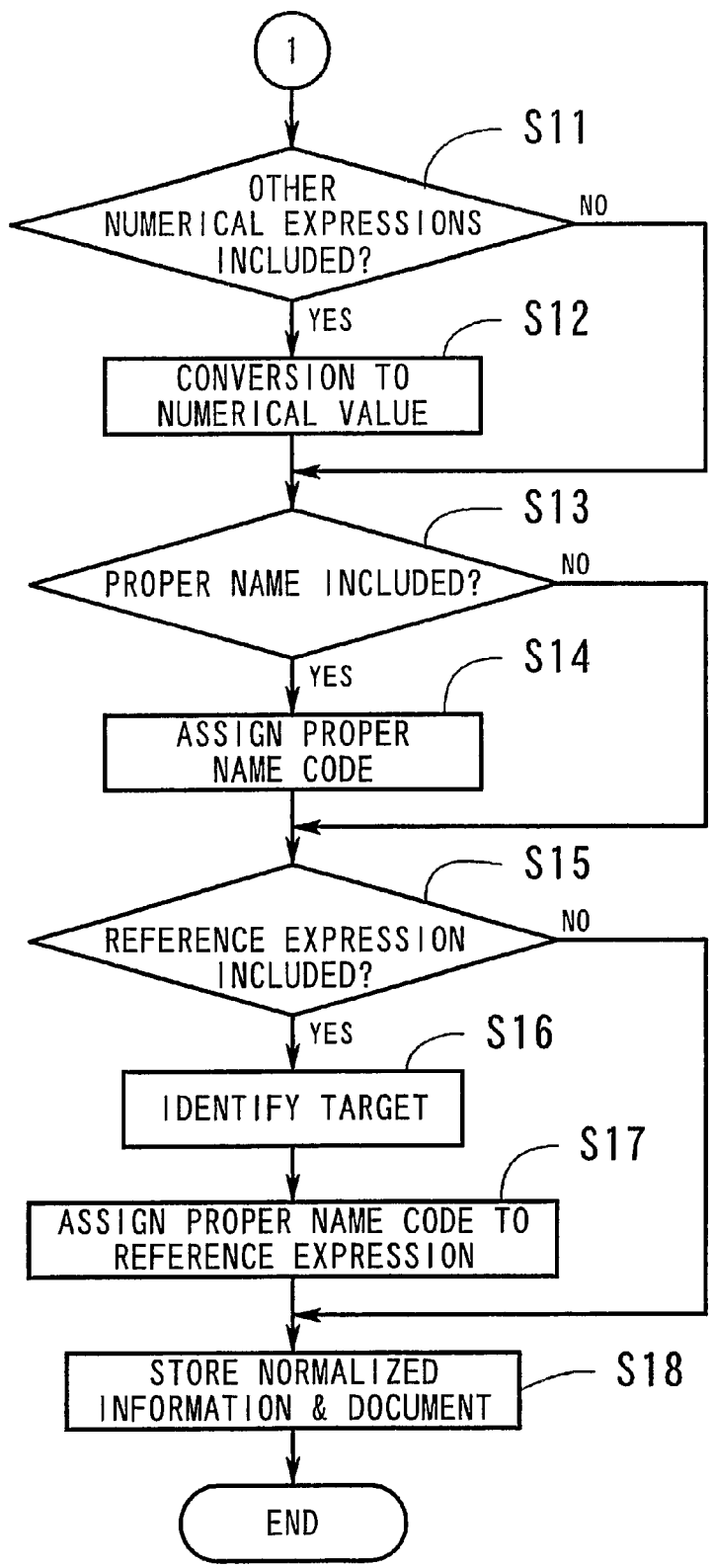
FIG. 4 is a flowchart also illustrating the document normalization process.

Specifically, the event specifying means 4, the attribute value extracting means 5 and the correlating means 10 execute the process shown in FIGS. 3 and 4, thereby to generate normalized information corresponding to the input document.

[S232] The document extracting means 12 and the importance calculating means 13 execute the "RELEVANCY DETERMINATION PROCESS" shown in FIG. 30. If, as a result, it is found that the generated normalized information matches a certain query, the newly input document is sent to the user who transmitted the query.

According to the process described above, in cases where a new document is input, the degree of relevancy between the normalized information of the input document and the normalized query from each user is calculated, and if the relevancy is found to be high, the document is sent to a corresponding user. It is therefore possible to accurately select and transmit documents that suit the user's request.

The above-described processing functions can be performed by a computer. In this case, the contents of the functions to be accomplished by the document processing system are described in a program recorded in a computer-readable recording medium. By executing the program by a computer, it is possible to perform the above-described process. The computer-readable recording medium includes magnetic recording device, semiconductor memory and the like.

To distribute the program to the market, the program may be stored in portable recording media such as CD-ROMs (Compact Disk Read Only Memories) or floppy disks. Alternatively, the program may be stored in the storage device of a computer connected to a network and may be transferred to other computers through the network. To execute the program by a computer, the program stored in a hard disk unit or the like of the computer is loaded into the main memory and executed.

As described above, according to the present invention, an event described in a document to be processed is specified, and attribute values of attributes relating to the specified event are extracted and correlated with entities in the real world to generate information, which is then looked up when performing document retrieval or clipping. Accordingly, documents can be retrieved or clipped based on accurate recognition of the individual attribute values, so that the accuracy of document retrieval or clipping can be enhanced.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A document processing system for storing input documents after subjecting the documents to a predetermined process, and for retrieving or clipping documents matching a given query from the stored documents, comprising:

knowledge information storing means for storing knowledge information used while processing an input document, where the processing comprises specifying, extracting, and correlating contents of the input document, and where the knowledge information comprises patterns describing contexts of text within which types of events are expected to be found;

event specifying means for specifying a type of an event described in the input document by looking up patterns in said knowledge information storing means and by matching text in the input document to a pattern that corresponds to the specified event type;

attribute value extracting means for extracting, from the document, attribute values of attributes relating to the event specified by said event specifying means by looking up the knowledge information stored in said knowledge information storing means;

correlating means for correlating the attribute values extracted by said attribute value extracting means with attributes associated with entities in the real world that are stored in said knowledge information storing means;

document storing means for storing the attribute values correlated by said correlating means and the document or information specifying a storage location thereof in a manner associated with each other; and document extracting means for retrieving or clipping a target document by looking up the attribute values and the query.

2. The document processing system according to claim 1, wherein, if the extracted attribute values include a proper name, said correlating means specifies a unique entity in the real world that is represented by the proper name by matching other of the attribute values to a subset of the stored attributes that are associated with the specified entity, and assigns to the proper name predetermined information uniquely identifying the specified entity, and said document extracting means looks up the predetermined information assigned by said correlating means to perform retrieval or clipping.

3. The document processing system according to claim 1, wherein, if the attribute values include a reference expression, said correlating means specifies an attribute value which the reference expression refers to.

4. The document processing system according to claim 3, further comprising importance calculating means for calculating a degree of importance of a target document by looking up a frequency of occurrence of a keyword included in the document, said importance calculating means equally processing the keyword and the reference expression whose target of reference is specified by said correlating means.

5. The document processing system according to claim 1, further comprising normalizing means for converting a numerically convertible attribute value, among the attribute values, to a corresponding numerical value, thereby normalizing the numerically convertible attribute value, and wherein said document extracting means looks up information normalized by said normalizing means to perform retrieval or clipping.

6. The document processing system according to claim 5, further comprising unit converting means for converting a unit of the numerical value obtained by said normalizing means into a predetermined unit.

7. The document processing system according to claim 5, further comprising tense acquiring means for acquiring tense of a predetermined sentence constituting the document, and creation date acquiring means for acquiring a date of creation of the document, and wherein said normalizing means looks up the tense of the document acquired by said tense acquiring means and the creation date acquired by said creation date acquiring means, to estimate a definite value of an attribute value indicating a date or a term.

8. The document processing system according to claim 7, further comprising importance calculating means for calculating a degree of importance of a target document by looking up a frequency of occurrence of a keyword included in the document, said importance calculating means calculating the degree of importance taking account of the date or term estimated by said normalizing means.

9. The document processing system according to claim 1, wherein said event specifying means, said attribute value extracting means and said correlating means process the query in a manner similar to that in which the document is processed, and said document extracting means looks up the attribute values of the document and of the query correlated by said correlating means, to perform retrieval or clipping.

10. A computer-readable recording medium recording a program for causing a computer to perform a process of storing input documents after subjecting the documents to a predetermined process and retrieving or clipping documents matching a given query from the stored documents, wherein the program causes the computer to function as knowledge information storing means for storing knowledge information necessary for processing an input document, and where the knowledge information comprises patterns describing contexts of text within which types of events are expected to be found;

event specifying means for specifying a type of an event described in the input document by looking up patterns stored in the knowledge information storing means, attribute value extracting means for extracting, from the document, attribute values of attributes relating to the event specified by the event specifying means by looking up the knowledge information stored in the knowledge information storing means, and by matching text in the input document to a pattern that corresponds to the specified event type;

correlating means for correlating the attribute values extracted by the attribute value extracting means with attributes associated with entities in real world that are stored in the knowledge information storing means, document storing means for storing the attribute values correlated by the correlating means and the document or information specifying a storage location thereof in a manner associated with each other, and document extracting means for retrieving or clipping a target document by looking up the attribute values and the query.

11. The apparatus according to claim 1, wherein the knowledge information used for processing input documents describes patterns of content that are expected to be found in a subject domain of the input documents.

12. A method for storing input documents after subjecting the documents to a predetermined process, and for retrieving or clipping documents matching a given query from the stored documents, comprising:

isolating an event and specifying a type of the event by parsing an input document using pre-stored rules comprising expressions that map event types to expressions expected in a subject domain of the input documents;

extracting, from the input document, a value of an attribute associated with the type of the isolated event, by looking up pre-stored knowledge information of the type of the event;

uniquely identifying a single specific real world entity that is named by the extracted value, by looking up pre-stored knowledge information of the entity;

storing the extracted value in association with the entity and the input document; and retrieving the stored input document by looking up the attribute value and the query.

13. An apparatus for storing input documents after subjecting the documents to a predetermined process, and for retrieving or clipping documents matching a given query from the stored documents, comprising:

an isolating unit isolating an event and specifying a type of the event by parsing an input document using pre-stored rules comprising expressions that map event types to expressions expected in a subject domain of the input documents;

an extracting unit extracting, from the input document, a value of an attribute associated with the type of the isolated event, by looking up pre-stored knowledge information of the type of the event;

an entity identifying unit uniquely identifying a single specific real world entity that is named by the extracted value, by looking up pre-stored knowledge information of the entity;

a storing unit storing the extracted value in association with the entity and content of the input document; and a retrieving unit retrieving the content of the input document by looking up the attribute value and the query.

14. A document processing system with a program for storing input documents after subjecting the documents to a predetermined process, and with a program for retrieving or clipping documents matching a given query from the stored documents, comprising:

a knowledge information storing unit storing a knowledge base used while processing an input document, where the processing comprises specifying, extracting, and correlating contents of the input document;

an event specifying unit specifying a type of an event described in the input document by looking up the knowledge base;

an attribute value extracting unit extracting, from the document, attribute values of attributes relating to the event specified by said event specifying unit by looking up the knowledge base;

a correlating unit for correlating the attribute values extracted by said attribute value extracting unit with entities in the real world by looking up the knowledge base;

a document storing unit for storing the attribute values correlated by said correlating unit in association with the document or information specifying a storage location thereof; and a document extracting unit for retrieving or clipping a target document by looking up the attribute values and the query.

* * * * *

UNITED STATES PATENT AND TRADEMARK OFFICE
CERTIFICATE OF CORRECTION

PATENT NO. : 6,523,025 B1
DATED : February 18, 2003
INVENTOR(S) : Minako Hashimoto et al.

It is certified that error appears in the above-identified patent and that said Letters Patent is hereby corrected as shown below:

<u>Title page,</u>
Item [56], References Cited, FOREIGN PATENT DOCUMENTS, please insert the following references cited:

```
-- 6-266765    9/1994    Japan
   63-73423    4/1988    Japan
   8-115327    5/1996    Japan
   5-46670     2/1998    Japan --
```

Signed and Sealed this

Seventeenth Day of June, 2003

JAMES E. ROGAN
*Director of the United States Patent and Trademark Office*